United States Patent
Masumoto et al.

(10) Patent No.: US 7,936,373 B2
(45) Date of Patent: May 3, 2011

(54) RECORDING DEVICE, RECORDING SYSTEM, AND RECORDING CONTROL METHOD THEREOF

(75) Inventors: Kazuyuki Masumoto, Kanagawa (JP); Takao Aichi, Tokyo (JP); Akitoshi Yamada, Kanagawa (JP); Fumihiro Goto, Kanagawa (JP); Kentaro Yano, Kanagawa (JP); Ruriko Mikami, Kanagawa (JP); Hiromitsu Hirabayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1728 days.

(21) Appl. No.: 10/921,940

(22) Filed: Aug. 20, 2004

(65) Prior Publication Data

US 2005/0052676 A1 Mar. 10, 2005

(30) Foreign Application Priority Data

Aug. 22, 2003 (JP) ................. 2003-298794
Aug. 22, 2003 (JP) ................. 2003-298797

(51) Int. Cl.
*H04N 1/46* (2006.01)
*H04N 1/32* (2006.01)
*H04N 1/64* (2006.01)

(52) U.S. Cl. ............. 348/207.2; 358/1.1; 358/1.15; 358/1.18; 710/65

(58) Field of Classification Search ........... 358/1.1, 358/1.15, 1.18; 710/65; 348/207.2

See application file for complete search history.

(56) References Cited

U.S. PATENT DOCUMENTS

| | | | | |
|---|---|---|---|---|
| 5,515,481 | A * | 5/1996 | Pardo | 358/1.18 |
| 6,273,535 | B1 * | 8/2001 | Inoue et al. | 347/3 |
| 6,698,949 | B2 | 3/2004 | Yoshioka et al. | |
| 6,711,637 | B2 * | 3/2004 | Tateyama | 710/65 |
| 6,856,422 | B1 | 2/2005 | Higashibata et al. | |
| 7,010,176 | B2 * | 3/2006 | Kusunoki | 382/299 |
| 7,012,709 | B2 | 3/2006 | Sugita | 358/1.15 |
| 7,170,627 | B2 | 1/2007 | Tanaka et al. | 358/1.15 |
| 7,230,729 | B1 * | 6/2007 | Reardon et al. | 358/1.13 |
| 7,426,051 | B2 * | 9/2008 | Endo et al. | 358/1.15 |
| 2002/0021320 | A1 * | 2/2002 | Miyazawa | 347/19 |
| 2004/0207869 | A1 * | 10/2004 | Endo | 358/1.15 |

FOREIGN PATENT DOCUMENTS

| | | |
|---|---|---|
| JP | 4-129443 | 4/1992 |
| JP | 8-044899 | 2/1996 |
| JP | 2000-218907 A | 8/2000 |
| JP | 2000-221618 A | 8/2000 |
| JP | 2000-259659 A | 9/2000 |
| JP | 2000-355142 | 12/2000 |
| JP | 2001-197406 | 7/2001 |
| JP | 2001-353936 | 12/2001 |
| JP | 2002-111926 A | 4/2002 |
| JP | 2002-135560 | 5/2002 |
| JP | 2002-254758 A | 9/2002 |
| JP | 2002-347310 | 12/2002 |
| JP | 2002-356043 A | 12/2002 |
| JP | 2003-61034 | 2/2003 |
| JP | 2003-85528 A | 3/2003 |
| JP | 2003-131834 A | 5/2003 |
| JP | 2003-143539 | 5/2003 |

* cited by examiner

*Primary Examiner* — King Y Poon
*Assistant Examiner* — Lawrence E Wills
(74) *Attorney, Agent, or Firm* — Fitzpatrick, Cella, Harper & Scinto

(57) ABSTRACT

A print command has a hierarchical structure including a vendor common code, and a vendor unique code, an index print mode or date print mode is designated using the common code, and a detailed print format of each image or the number of index images per sheet in the index print mode can be designated using the unique code.

10 Claims, 24 Drawing Sheets

FIG. 7

```
<startJob>
  <jobConfig>
    <quality>50000000</quality>                    — 700
    <paperSize>51060000</paperSize>                — 701
    <paperType>52020000</paperType>                — 702
    <fileType>53000000</fileType>                  — 703
    <datePrint>54010000</datePrint>                — 704
    <fileNamePrint>55000000</fileNamePrint>        — 705
    <imageOptimize>56000000</imageOptimize>        — 706
    <fixedSize>58030000</fixedSize>                — 707
    <cropping>59000000</cropping>                  — 708
  </jobConfig>
  <printInfo>
    <fileID>00000001</fileID>                      — 709
    <date>2002/10/28</date>                        — 710
  </printInfo>
</startJob>
```

720 — (jobConfig block)
721 — (printInfo block)

F I G. 8A

| prtPID | ImagePath | copyID | progress | imagePrinted |
|---|---|---|---|---|

F I G. 8B

| dpsPrint ServiceStatus | jobEnd Reason | error Status | error Reason | disconnect Enable | Capability Changed | newJobOK |
|---|---|---|---|---|---|---|

FIG. 9A

```
<input>
  <getCapability>
   <Capability>
     <layouts/> ~901
   </Capability>
  </getCapability>
</input>
```

FIG. 9B

```
<output>
  <result>10000000</result>
  <getCapability>
    <Capability> ~902
     <layouts/> ~903
      57000000 57FE0000 ~904
     </layouts> ~905
    </Capability> ~906
  </getCapability>
</output>
```

X X X X : MAJOR CODE

Y Y Y Y : MINOR CODE

Y Y Y Y  MEANING OF YYYY IS DETERMINED BY VALUE AS FOLLOWS:

0000 : DEFAULT 0001-7FFF : VENDOR COMMON CODE

8000-FFFF : VENDOR UNIQUE CODE

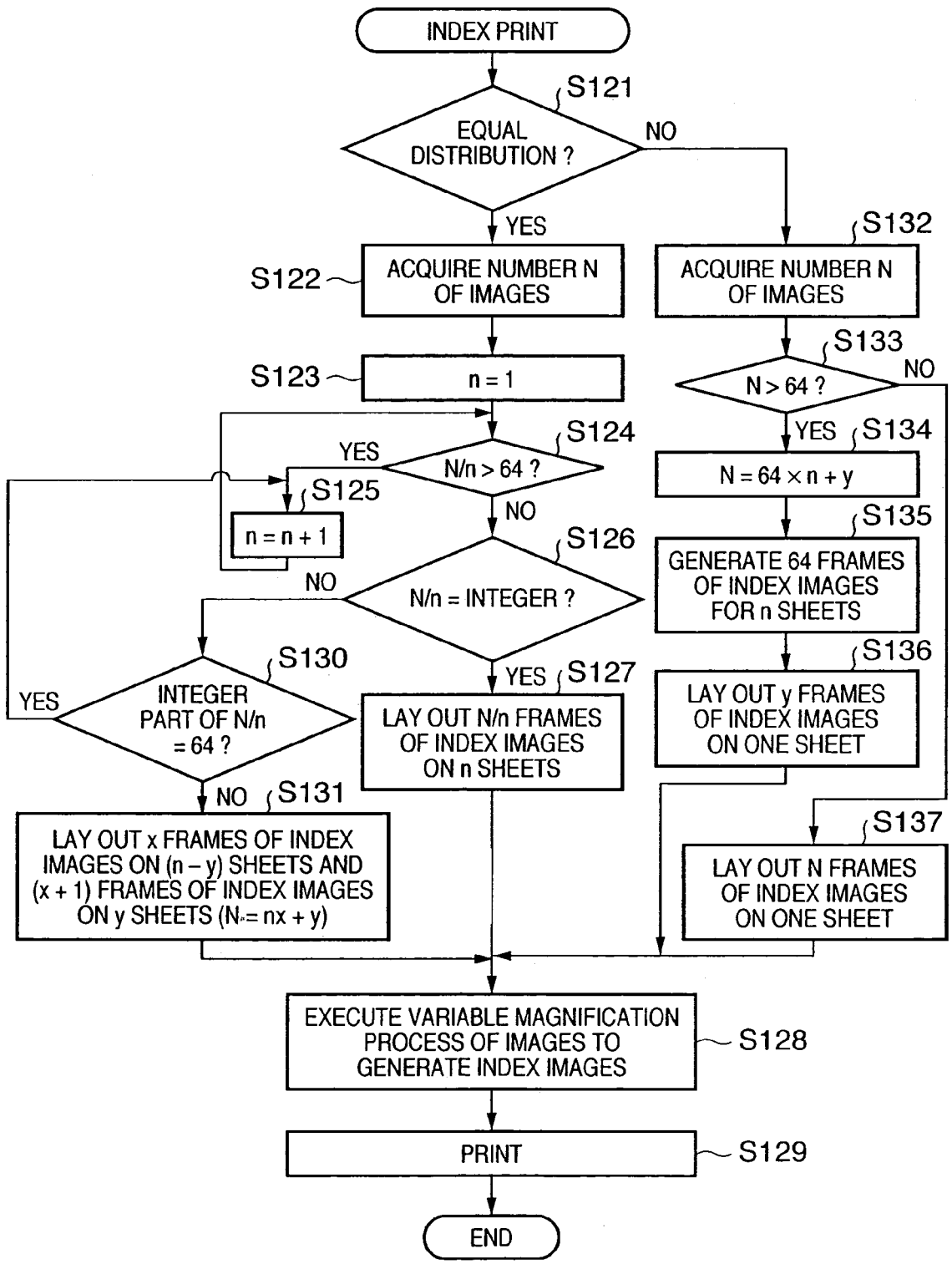

FIG. 14A

```
<input>
  <notifyDeviceStatus>
    <dpsPrintServiceStatus>70010000</dpsPrintServiceStatus>
    <jobEndReason>71000000</jobEndReason>
    <errorStatus>72010000</errorStatus>
    <errorReason>73010000</errorReason>
    <disconnectEnable>74010000</disconnectEnable>
    <capabilityChanged>75010000</capabilityChanged>
    <newJobOK>76000000</newJobOK> ~1401
  </notifyDeviceStatus>
</input>
```

FIG. 14B

```
<output>
  <result>10000000</result>
  <notifyDeviceStatus/>
</output>
```

FIG. 17A

```
<input>
  <getCapability>
    <Capability>
      <layouts/> ~1711
    </Capability>
  </getCapability>
</input>
```

FIG. 17B

```
<output>
  <result>10000000</result>
  <getCapability>
    <Capability> ~1712
      <layouts/> ~1713
        57000000  57010000  57020000 ~1714
      </layouts> ~1715
    </Capability> ~1716
  </getCapability>
</output>
```

FIG. 18A

```
<input>
  <getFileInfo>
    <fileID>00000001</fileID>
  </getFileInfo>
</input>
```

FIG. 18B

```
<output>
  <result>10000000</result>
  <getFileInfo>
    <fileType>53010000</fileType>
    <fileSize>000F4240</fileSize>
  </getFileInfo>
</output>
```

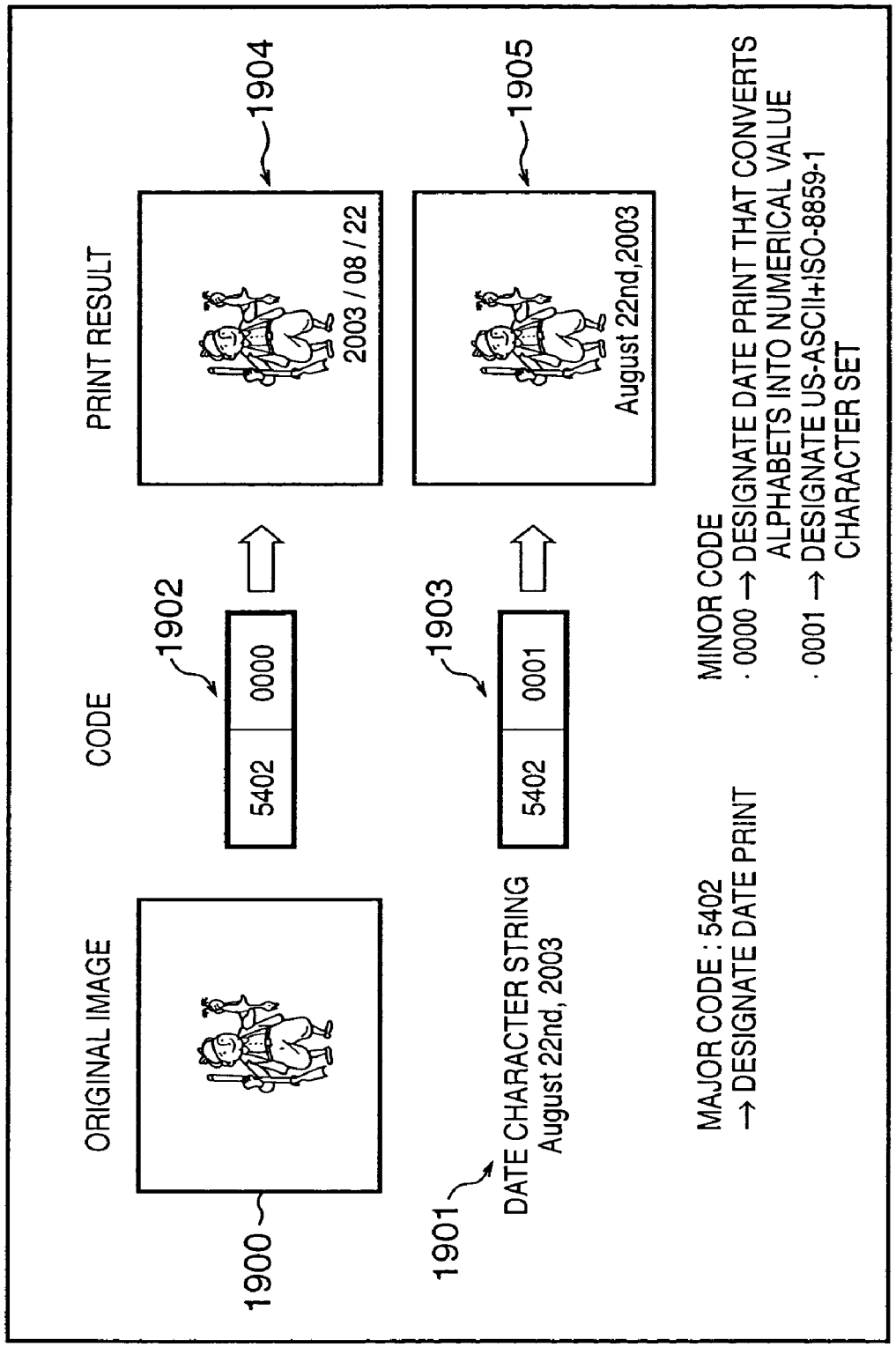

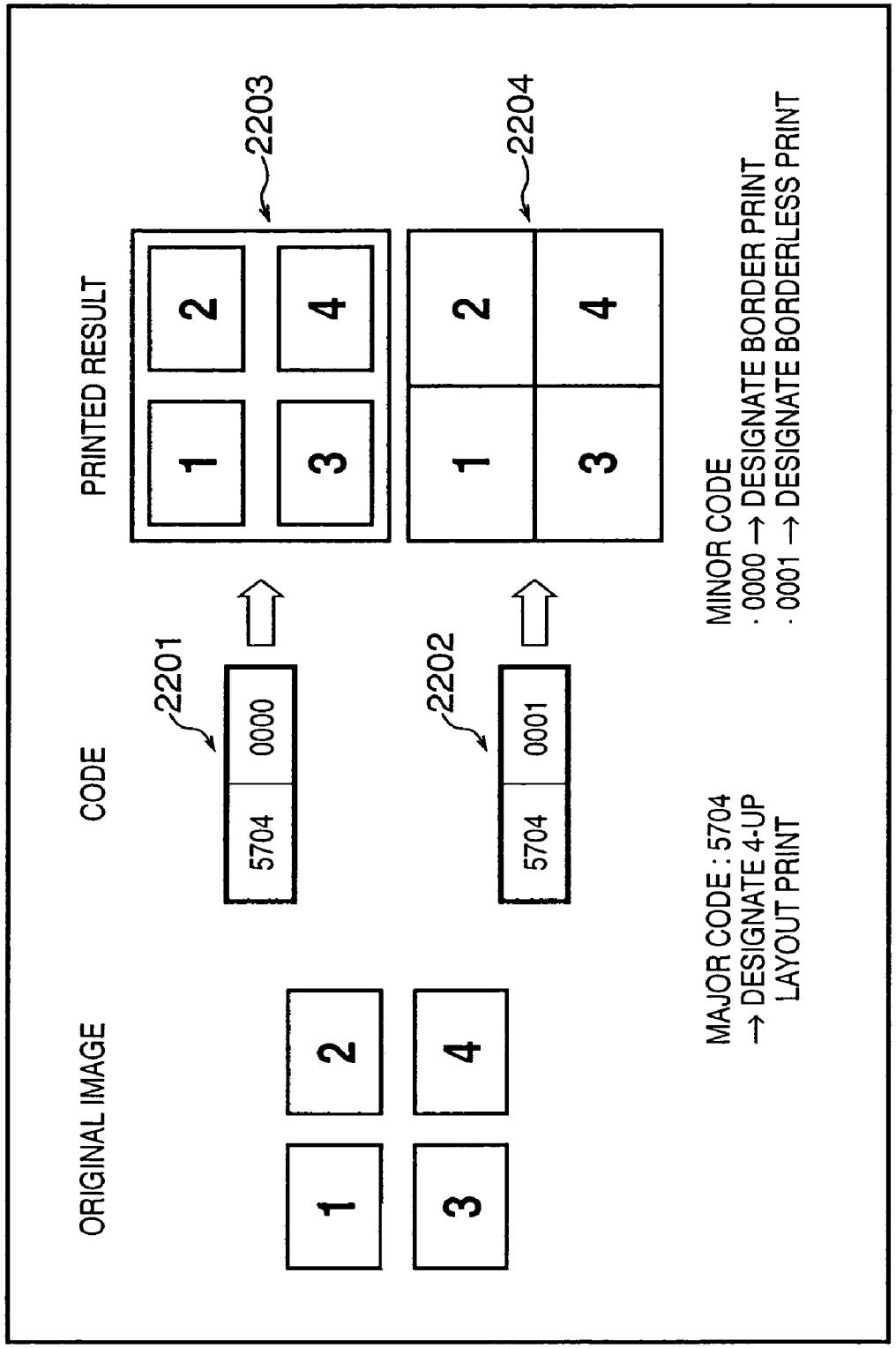

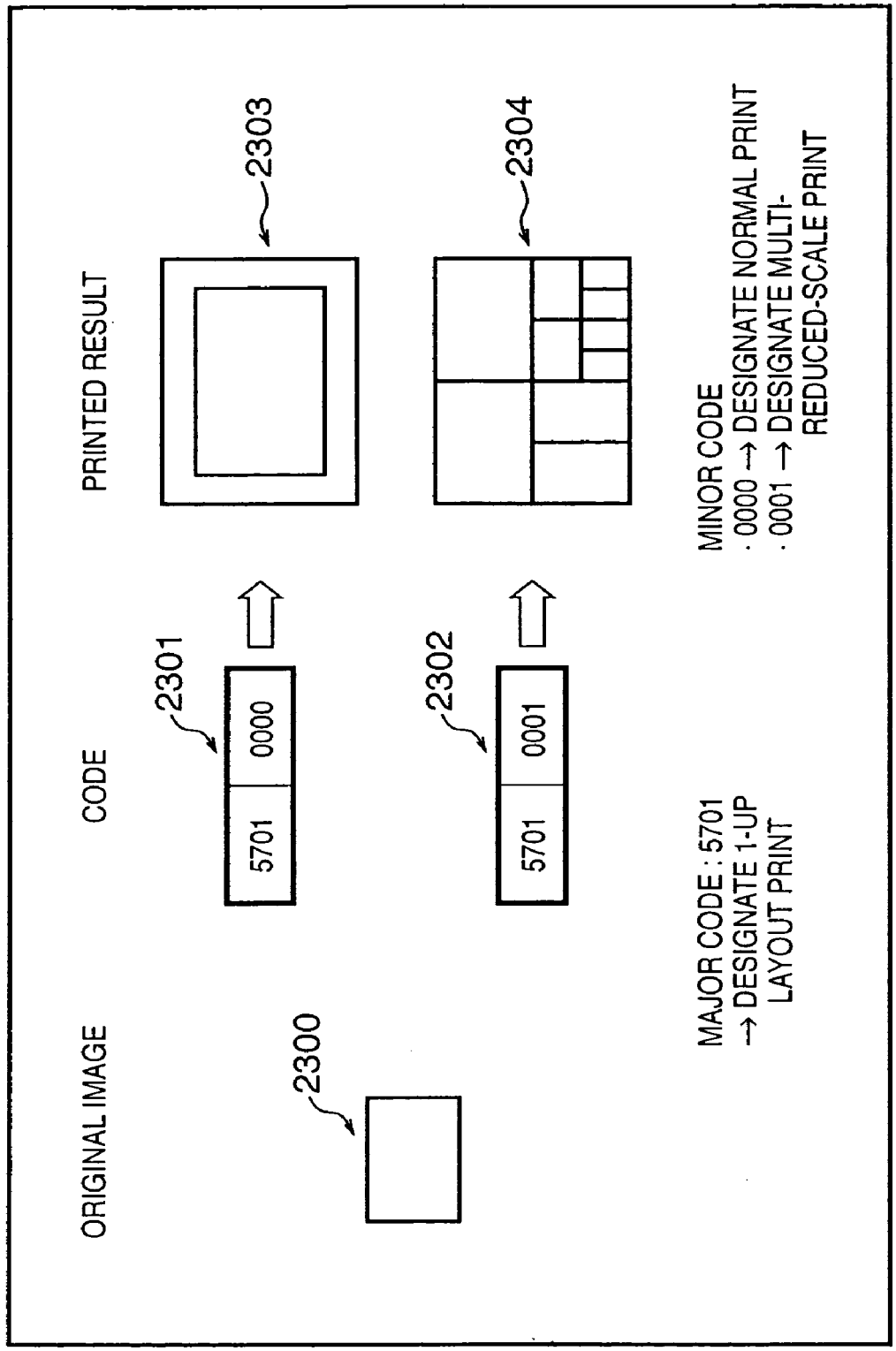

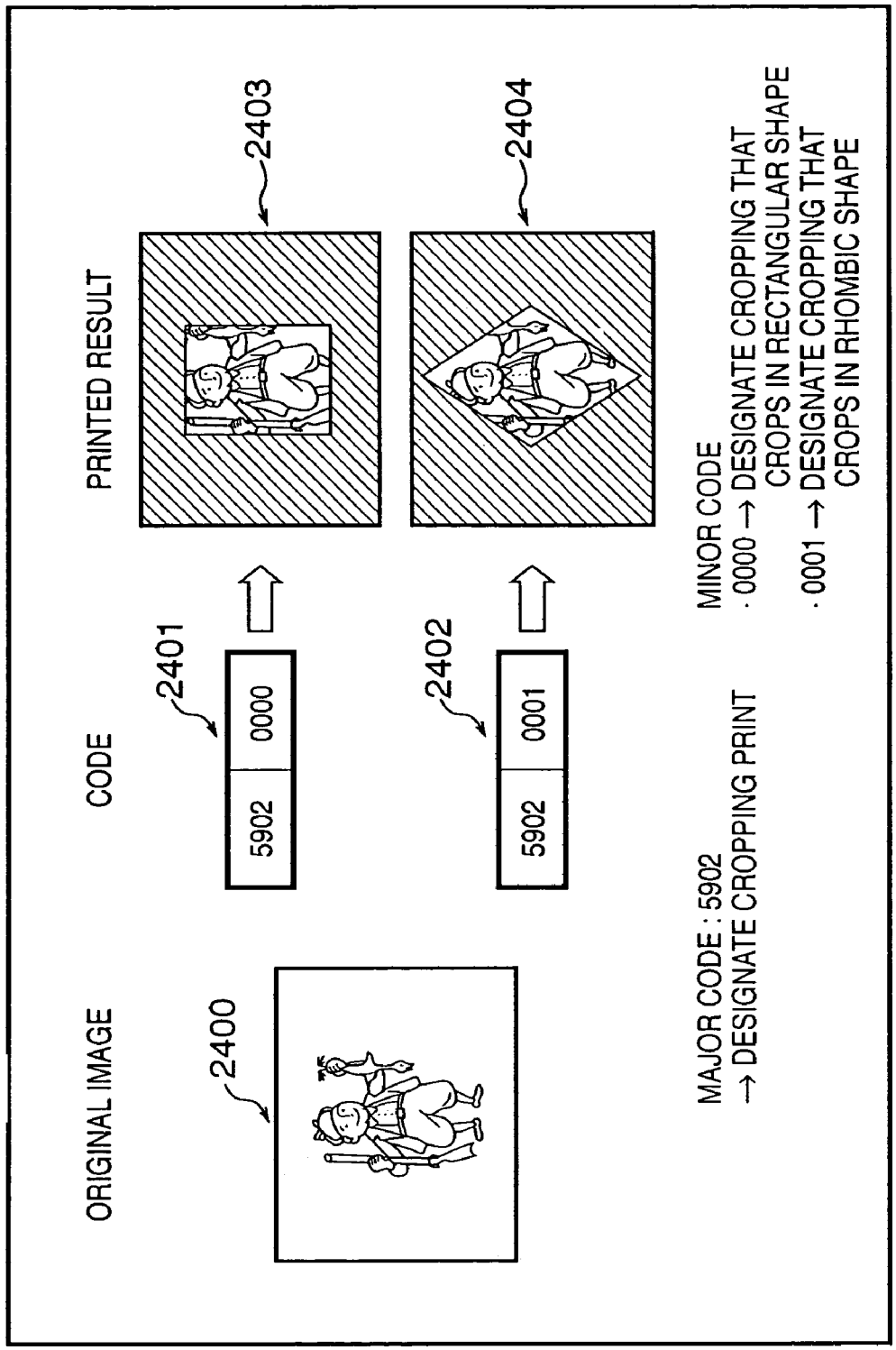

RECORDING DEVICE, RECORDING SYSTEM, AND RECORDING CONTROL METHOD THEREOF

FIELD OF THE INVENTION

The present invention relates to a recording device, a recording system, and a control method and program thereof, which record an image on a recording medium on the basis of image data supplied from an image supply device.

BACKGROUND OF THE INVENTION

In recent years, digital cameras (image sensing devices) which can sense an image and can convert the sensed image into digital image data by a simple operation have been popularly used. When an image sensed by such camera is printed and is used as a photograph, it is a common practice to temporarily download the sensed digital image data from a digital camera to a PC (computer), to execute an image process by that PC, and to output the processed image data from the PC to a color printer, thus recording an image.

By contrast, a color print system which allows a digital camera to directly transfer digital image data to a color printer without the intervention of any PC and can print it out (to be referred to as a direct print process hereinafter), a so-called photo-direct (PD) printer which can receive a memory card, which is mounted on a digital camera and stores sensed images, and can print sensed images, and the like have recently been developed (see Japanese Patent Laid-Open No. 2003-061034).

As the memory size of such memory card increases, a large number of image files can be stored in a single memory card, but it becomes difficult to confirm correspondence between image files and memory cards that store them. For this reason, of DP printers, models that can output index prints like those which are attached upon making additional prints of silver halide photographs are increasing. An index print is a print of a list of thumbnail images of image files stored in a memory card, and is used for the purpose of confirming and selecting images to be actually printed rather than a print which is used to appreciate and enjoy images. Therefore, upon making an index print, identifiers (e.g., numbers and the like) are appended to respective images. Also, upon making an index print, a maximum number of images which can be printed by a printer on a single recording medium (sheet) are normally printed.

However, a conventional index print allows the user to confirm what kind of image it is but does not allow him or her to confirm the image quality since the size of each image is too small. For example, only after an image confirmed on an index print is printed in a large size (e.g., a standard L size), the user often finds that the image is out of focus, it has abnormal color tincture, and so forth. As a result, not only labor required to print but also inks and a sheet required to print the image are wasted. Such problem can be solved if the size of each index image is increased. However, as described above, since the memory card has a large memory size and stores a very large number of images, the need for recording many images (increasing the number of frames to be printed) and confirming many images at once has arisen so as to efficiently confirm a large number of images stored in the memory card.

On the other hand, in order to print a large number of index images per sheet, a printer must have a huge memory size for storing these image data. Hence, the maximum number of index images that can be printed largely depends on the manufacturing cost of a printer. Under the present circumstances, the maximum number of images per sheet in an index print equals the maximum number of images that can be printed by a printer. For example, when an A4-size index print is to be made, the number of index images on the print often falls within the range from about 60 to 100.

SUMMARY OF THE INVENTION

The present invention has been made in consideration of the above prior art, and has as its characteristic feature to provide a recording device, recording system, and recording control method, which can control the number of images and image size to optimal values in an index recording mode.

According to one aspect of the present invention, there are provided a recording device, recording system, and recording control method, which can execute a recording process according to the functions of a recording device without forcing an image supply device to have a recording job generation function according to the recording functions of the recording device.

According to an aspect of the present invention, there is provided with a recording system which includes an image supply device, and an image recording device for recording an image on a recording medium on the basis of image data supplied from the image supply device, wherein a command to be exchanged between the image supply device and the image recording device has a hierarchical structure, in which an upper layer specifies a code that must be recognized independently of devices, and a lower layer specifies a code that is recognized depending on devices, and the upper layer includes information for designating an index recording function, and the lower layer includes information associated with a determination method of the number of index images to be recorded on a single recording medium in the index recording function.

According to an aspect of the present invention, there is provided with a recording apparatus for recording an image on a recording medium on the basis of image data supplied from an image supply device, comprising: reception means for receiving a recording command with a hierarchical structure transmitted from the image supply device; determination means for determining whether an upper layer of the recording command designates an index recording mode for recording index images; and control means for, in a case where the determination means determines that the index recording mode is designated, controlling to execute a recording process according to a recording mode designated by a lower layer of the upper layer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 7 depicts a view for explaining an actual example of a print start command issued by the DSC according to the embodiment of the present invention;

FIGS. 8A and 8B depict views for explaining JobStatus and DeviceStatus, which are sent from the PD printer to the DSC according to the embodiment of the present invention;

FIGS. 9A and 9B depict views for explaining exchange of capability data of the PD printer according to the embodiment of the present invention, in which FIG. 9A shows an example of a capability request command from the DSC to the PD printer, and FIG. 9B shows a response command from the PD printer to the DSC;

FIG. 10 depicts a view for explaining the code format of capability data to be sent from the PD printer to the DSC according to the embodiment of the present invention;

FIG. 13 is a flowchart for explaining an index print process in the PD printer according to the first embodiment of the present invention;

FIGS. 14A and 14B depict views for explaining another code format to be sent from the PD printer to the DSC according to the embodiment of the present invention;

FIGS. 17A and 17B depict views for explaining exchange of capability data of the PD printer according to the fifth embodiment of the present invention, in which FIG. 17A shows an example of a capability request command from the DSC to the PD printer, and FIG. 17B shows a response command from the PD printer to the DSC;

FIGS. 18A and 18B depict views for explaining an example of acquisition of file information of an image to be printed according to the fifth embodiment of the present invention, in which FIG. 18A shows an example of a file request command from the PD printer to the DSC, and FIG. 18B shows an example of a command upon sending an image file from the DSC to the PD printer;

FIG. 19 shows a print result in a direct print system according to the fifth embodiment of the present invention;

FIG. 22 shows a print result example in a direct print system according to the seventh embodiment of the present invention;

FIG. 23 shows a print result example in a direct print system according to the eighth embodiment of the present invention; and FIG. 24 shows a print result example in a direct print system according to the ninth embodiment of the present invention.

DESCRIPTION OF THE PREFERRED EMBODIMENTS

Preferred embodiments of the present invention will be described in detail hereinafter with reference to the accompanying drawings.

<Overview of Printer>

Figure 1:
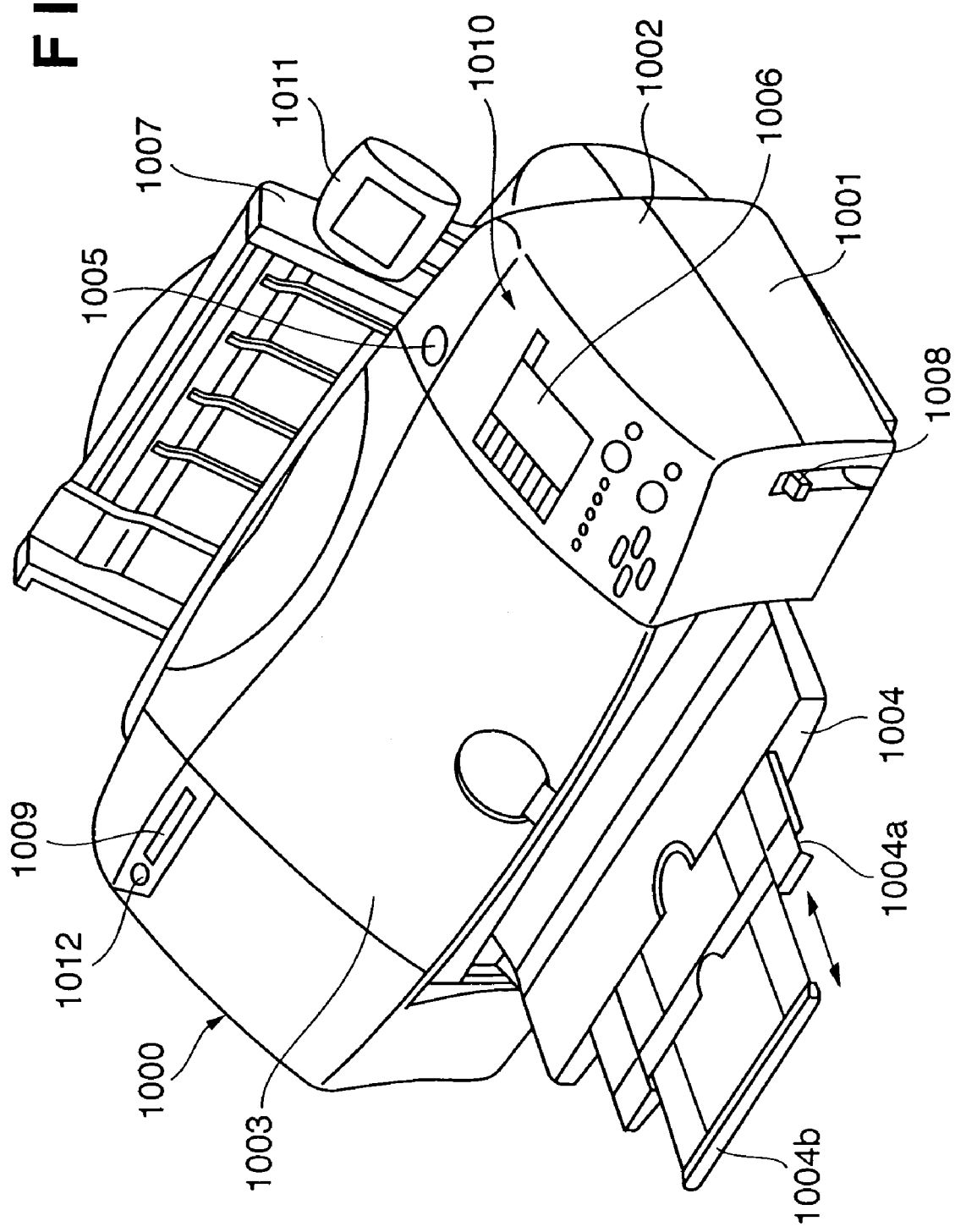
FIG. 1 depicts a schematic perspective view of a PD printer according to an embodiment of the present invention.

FIG. 1 depict a schematic perspective view of a photo-direct printer device (to be referred to as a PD printer hereinafter) 1000 according to an embodiment of the present invention. This PD printer 1000 has a function of recording data received from a host computer (PC) as a normal PC printer, and a function of recording image data directly read from a storage medium such as a memory card or the like, and recording image data received from a digital camera, PDA, or the like.

Referring to FIG. 1, a main body which forms a housing of the PD printer 1000 according to this embodiment has a lower case 1001, upper case 1002, access cover 1003, and exhaust tray 1004 as exterior members. The lower case 1001 nearly forms the lower half portion of the PD printer 1000, and the upper case 1002 nearly forms the upper half portion of the main body. By combining these cases, a hollow structure which has a storage space that stores mechanisms to be described later is formed. Openings are respectively formed on the upper and front surfaces of the main body. One end portion of the exhaust tray 1004 is rotatably held by the lower case 1001, and rotation of the tray 1004 opens/closes the opening formed on the front surface of the lower case 1001. Hence, upon executing a print operation, the exhaust tray 1004 is rotated toward the front surface side to open the opening, so that printed sheets (including plain paper, dedicated paper, resin sheet, and the like; to be simply referred to as a sheet hereinafter) can be exhausted from the opening. The exhausted sheets are stacked on the exhaust tray 1004 in turn. The exhaust tray 1004 stores two auxiliary trays 1004a and 1004b. When these auxiliary trays are pulled out as needed, the loading area of sheets can be enlarged/reduced in three steps.

One end portion of the access cover 1003 is rotatably held by the upper case 1002 to be able to open/close the opening formed on the upper surface of the main body. When the access cover 1003 is opened, a printhead cartridge (not shown), ink tanks (not shown), or the like housed in the main body can be exchanged. Although not shown, when the access cover 1003 is opened/closed, a projection formed on the rear surface of the cover 1003 rotates a cover open/close lever. By detecting the rotation position of that lever using a microswitch or the like, the open/close state of the access cover 1003 is detected.

A power key 1005 is arranged on the upper surface of the upper case 1002. A control panel 1010 which comprises a liquid crystal display 1006, various key switches, and the like is provided on the right side of the upper case 1002. The structure of the control panel 1010 will be described in detail later with reference to FIG. 2. Reference numeral 1007 denotes an automatic feeder which automatically feeds a sheet into the device main body. Reference numeral 1008 denotes a paper gap select lever which is used to adjust the gap between the printhead and sheet. Reference numeral 1009 denotes a card slot which receives an adapter that can receive a memory card. Via this adapter, image data stored in the memory card can be directly fetched and printed. As this memory card (PC), for example, a compact flash® memory card, smart media card, memory stick, and the like are available. Reference numeral 1011 denotes a viewer (liquid crystal display unit) which is detachable from the main body of this PD printer 1000, and is used to display an image for one frame, index images, and the like, when the user wants to search images stored in the PC card for an image to be printed. Reference numeral 1012 denotes a USB terminal used to connect a digital camera (to be described later). Also, another USB connector used to connect a personal computer (PC) is provided on the rear surface of this PD printer 1000.

<Overview of Printer Console>

Figure 2:
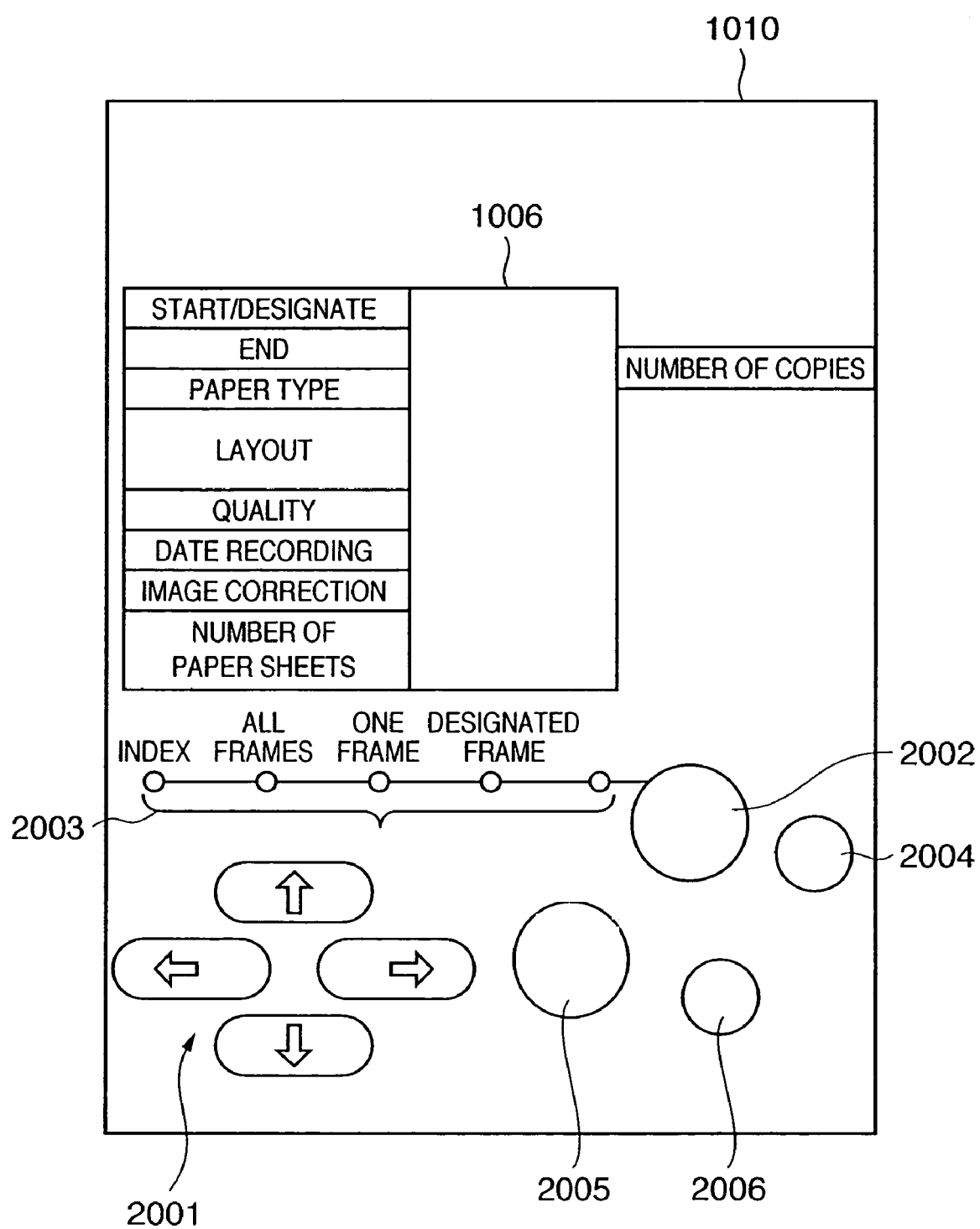
FIG. 2 depicts a schematic view of a control panel of the PD printer according to the embodiment of the present invention.

FIG. 2 depicts a schematic view of the control panel 1010 of the PD printer 1000 according to this embodiment.

Referring to FIG. 2, the liquid crystal display unit 1006 displays menu items used to make various setups of data associated with item names printed on the right and left sides of the unit 1006. The items displayed here include, e.g., the first photograph number of a photograph image to be printed of a plurality of photograph image files or designated frame number (start frame designation/print frame designation), the last photograph number of a photograph image to be printed at the end of a print process (end), the number of prints (number of copies), the type of sheet used in a print process (paper type), the setup of the number of photographs to be printed per sheet (layout), designation of print quality (quality), designation as to whether or not to print a photographing date (date recording), designation as to whether or not to print a photograph after correction (image correction), display of the number of sheets required for the print process (number of sheets), and the like. These items are selected or designated using cursor keys 2001. Reference numeral 2002 denotes a mode key. Every time this key is pressed, a print mode (index print, all-frame print, one-frame print, designated-frame print, and the like) can be switched, and a corresponding one of LEDs 2003 is turned on in accordance with the selected print mode. Reference numeral 2004 denotes a maintenance key which is used to do maintenance of the printer (e.g., cleaning of the printhead, and the like). Reference numeral 2005 denotes a print start key which is pressed when the start of a print process is instructed or when the maintenance setup is settled. Reference numeral 2006 denotes a print cancel key which is pressed when a print process or maintenance is canceled.

<Overview of Printer Electric Specification>

The arrangement of principal part associated with the control of the PD printer 1000 according to this embodiment will be described below with reference to FIG. 3. Note that the same reference numerals in FIG. 3 denote parts common to those in the above drawings, and a description thereof will be omitted.

Figure 3:
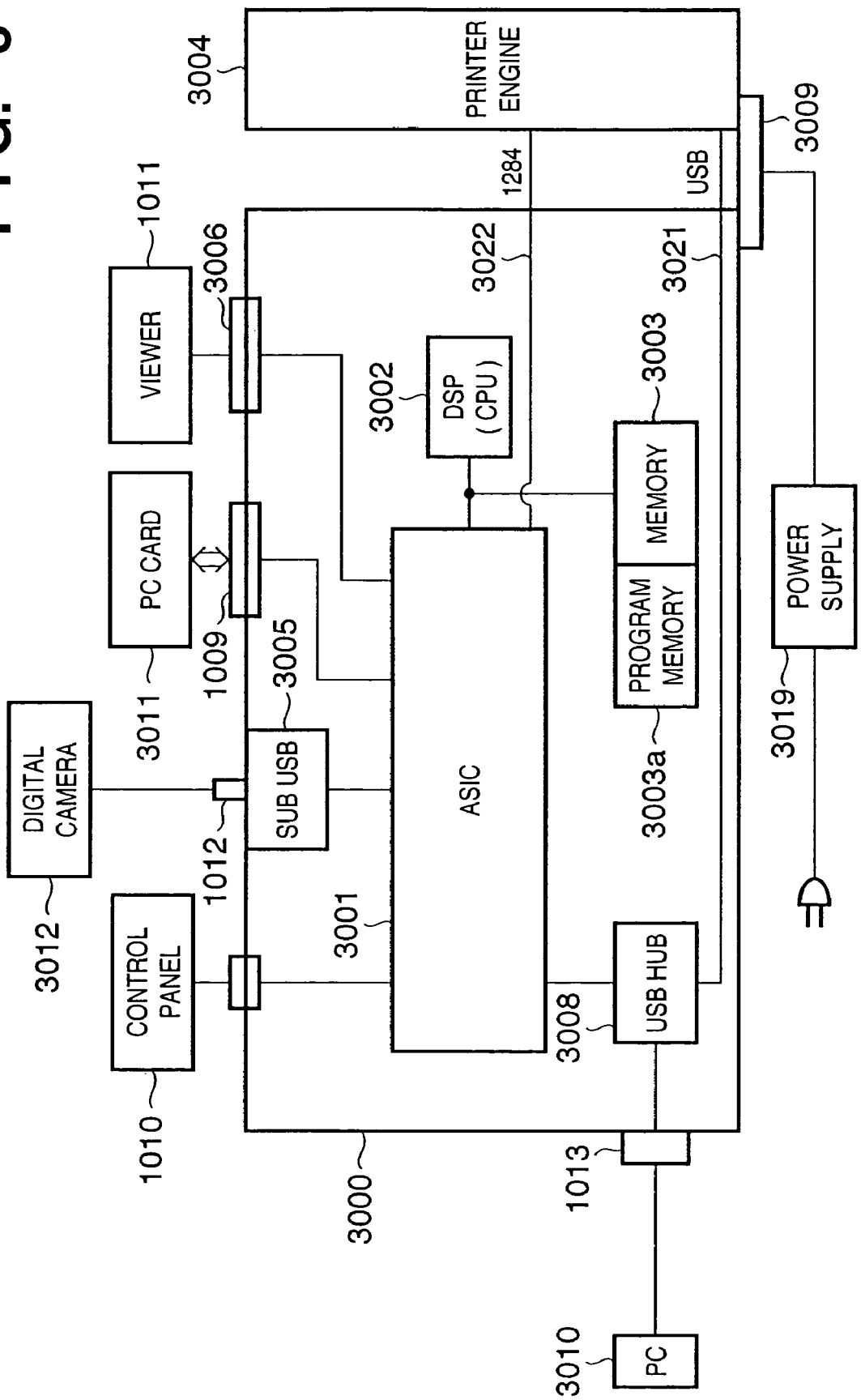
FIG. 3 is a block diagram showing the arrangement of principal part associated with control of the PD printer according to the embodiment of the present invention.

Referring to FIG. 3, reference numeral 3000 denotes a controller (control board). Reference numeral 3001 denotes an ASIC (application specific LSI). Reference numeral 3002 denotes a DSP (digital signal processor), which includes a CPU and executes various control processes to be described later, and image processes such as conversion from a luminance signal (RGB) into a density signal (CMYK), scaling, gamma conversion, error diffusion, and the like. Reference numeral 3003 denotes a memory, which has a program memory 3003a for storing a control program to be executed by the CPU of the DSP 3002, a RAM area for storing a running program, and a memory area that serves as a work area for storing image data and the like. Reference numeral 3004 denotes a printer engine. In this embodiment, the printer is equipped with a printer engine of an ink-jet printer which prints a color image using a plurality of color inks. Reference numeral 3005 denotes a USB connector as a port for connecting a digital camera (DSC) 3012. Reference numeral 3006 denotes a connector for connecting the viewer 1011. Reference numeral 3008 denotes a USB hub (USB HUB). When the PD printer 1000 executes a print process based on image data from a PC 3010, the USB hub 3008 allows data received from the PC 3010 to pass through it, and outputs the data to the printer engine 3004 via a USB 3021. In this way, the PC 3010 connected to the printer can execute a print process by directly exchanging data, signals, and the like with the printer engine 3004 (the printer serves as a normal PC printer). Reference numeral 3009 denotes a power supply connector, which inputs a DC voltage which is converted from commercial AC power by a power supply 3019. The PC 3010 is a general personal computer. Reference numeral 3011 denotes a memory card (PC card) mentioned above; and numeral 3012 denotes a digital camera (DSC: Digital Still Camera).

Note that signals are exchanged between this controller 3000 and printer engine 3004 via the aforementioned USB 3021 or an IEEE1284 bus 3022.

<Overview of Digital Camera>

Figure 4:
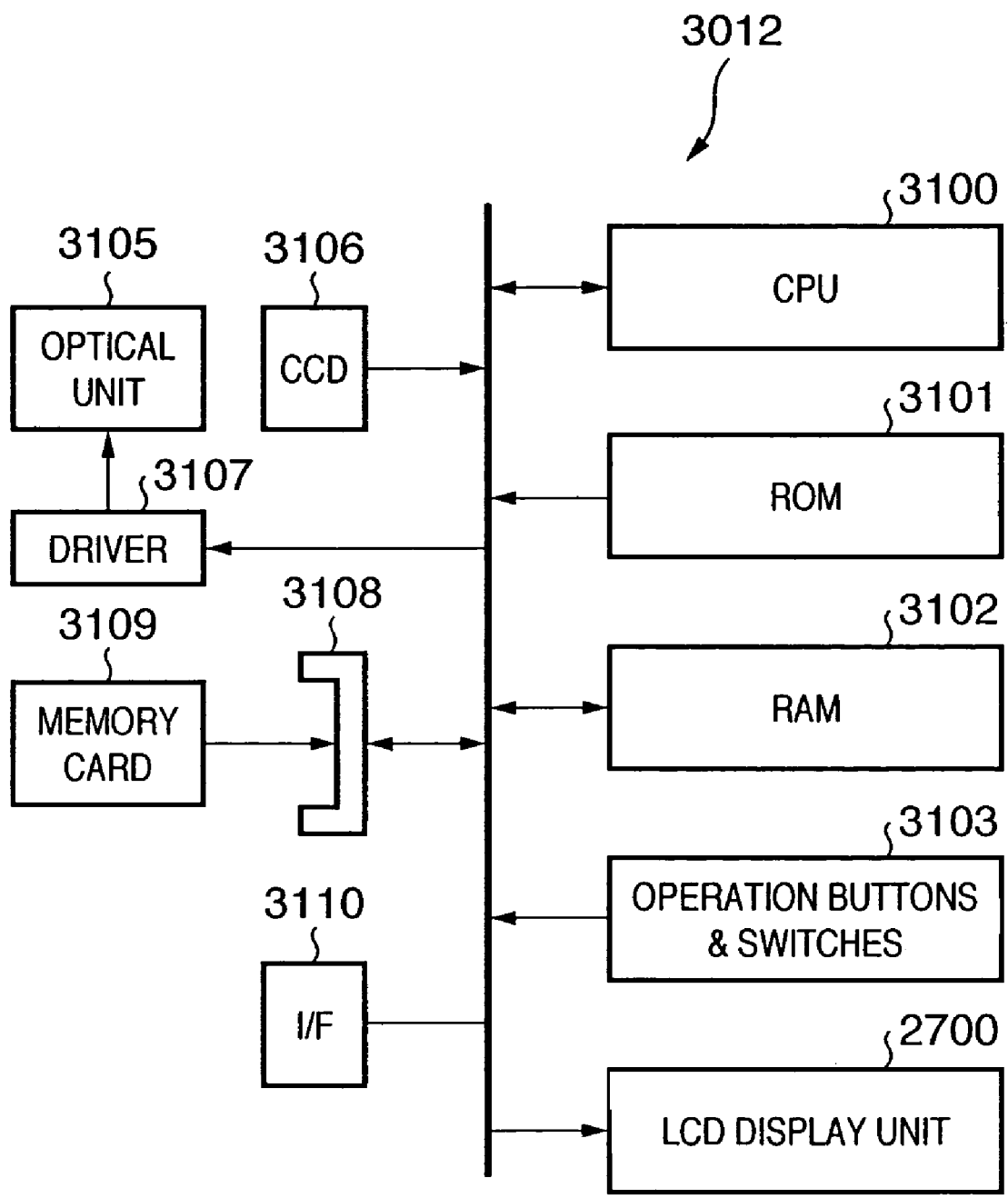
FIG. 4 is a block diagram showing the arrangement of a DSC according to the embodiment of the present invention.

FIG. 4 is a block diagram showing the arrangement of the DSC (digital camera) 3012 according to this embodiment.

Referring to FIG. 4, reference numeral 3100 denotes a CPU which controls the overall DSC 3012; and numeral 3101 denotes a ROM that stores the processing sequence by the CPU 3100. Reference numeral 3102 denotes a RAM which is used as a work area of the CPU 3100; and numeral 3103 denotes a switch group which is used to make various operations, and includes a shutter, mode switch, select switch, cursor keys, and the like. Reference numeral 2700 denotes a liquid crystal display unit which is used to display a video picture that is captured currently, and images photographed and stored in the memory card, and to display a menu upon making various setups. Reference numeral 3105 denotes an optical unit which mainly comprises a lens and its drive system. Reference numeral 3106 denotes a CCD element; and numeral 3107 denotes a driver for controlling to drive the optical unit 3105 under the control of the CPU 3100. Reference numeral 3108 denotes a connector used to connect a storage medium 3109 (compact flash® memory card, smart media, or the like); and numeral 3110 denotes a USB interface (slave side of the USB) used to connect a PC or the PD printer in this embodiment.

<Overview of Camera/Printer Connection>

Figure 5:
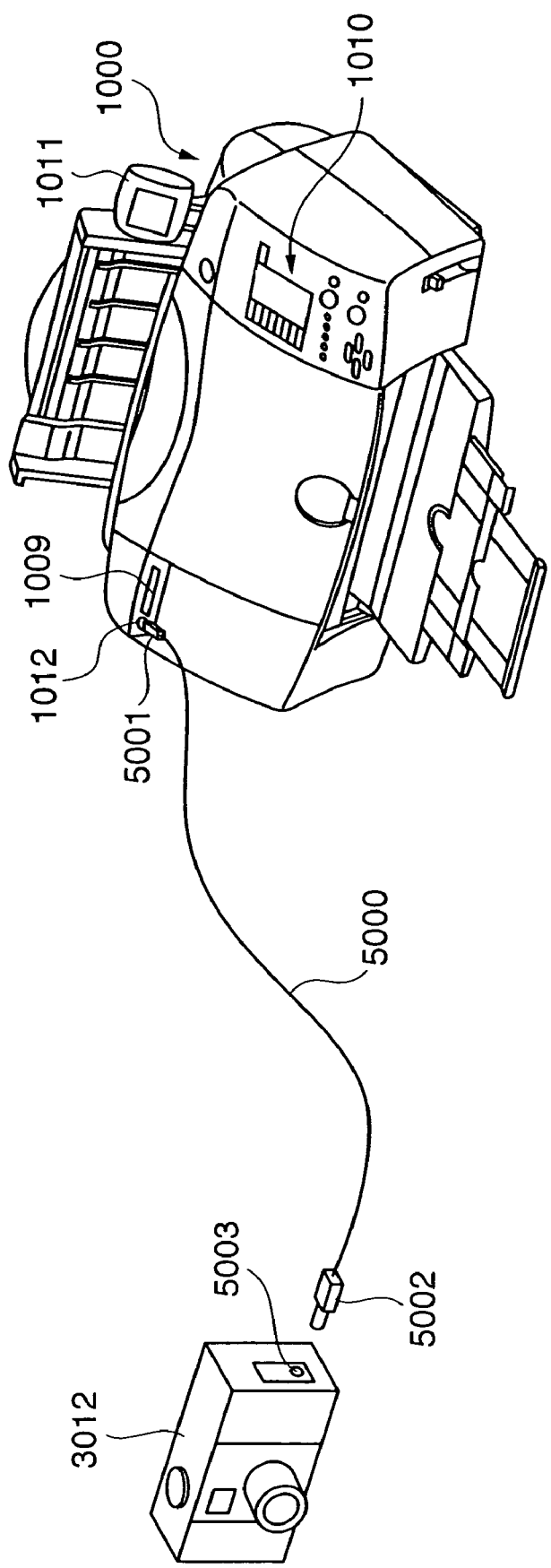
FIG. 5 depicts a view for explaining connection between the PD printer and digital camera according to the embodiment of the present invention.

FIG. 5 depicts a view for explaining connection between the PD printer 1000 and DSC 3012 according to this embodiment. The same reference numerals in FIG. 5 denote parts common to those in the above drawings, and a description thereof will be omitted.

Referring to FIG. 5, a cable 5000 comprises a connector 5001 which is connected to the connector 1012 of the PD printer 1000, and a connector 5002 which is connected to a connector 5003 of the digital camera 3012. The digital camera 3012 can output image data saved in its internal memory via the connector 5003. Note that the digital camera 3012 can adopt various arrangements, e.g., an arrangement that comprises an internal memory as storage means, an arrangement that comprises a slot for receiving a detachable memory card, and so forth. When the PD printer 1000 and digital camera 3012 are connected via the cable 5000 shown in FIG. 5, image data output from the digital camera 3012 can be directly printed by the PD printer 1000.

An overview of the operation in the print system including the DSC 3012 and PD printer 1000 based on the above arrangements will be described below. Note that in the print system according to the embodiment, the DSC 3012 and PD printer 1000 can make operations that follow the specification of a sequence DPS (Direct Print System) according to this embodiment.

<Overview of Direct Print System>

Figure 6:
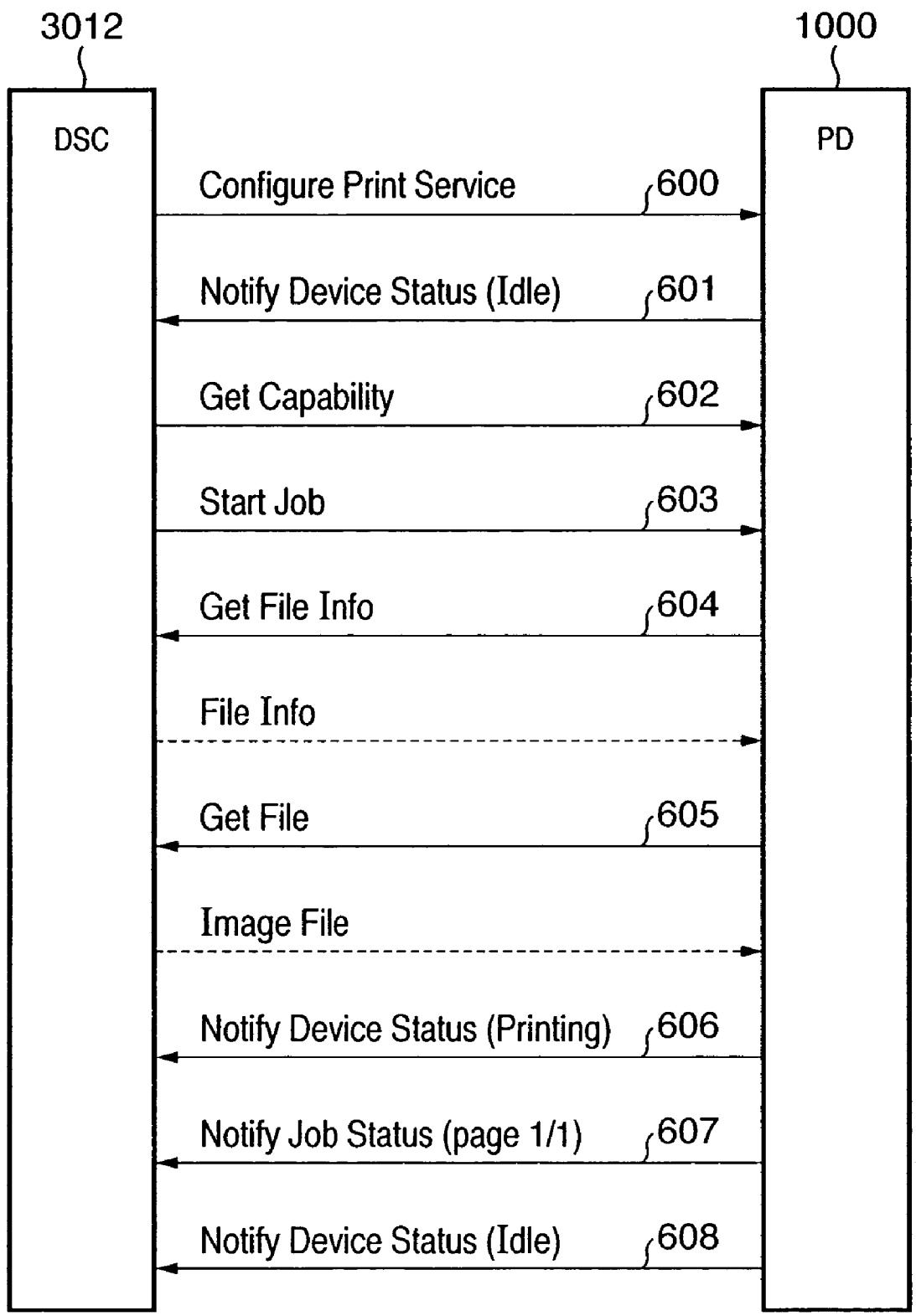
FIG. 6 is a chart for explaining exchange of commands between the PD printer and DSC in a print system according to the embodiment of the present invention.

FIG. 6 is a chart for explaining a sequence executed when the DSC 3012 issues a print request to the PD printer 1000 to execute a print process in the print system according to the embodiment.

This processing sequence is executed after the PD printer 1000 and DSC 3012 are connected via the USB cable 5000 and confirm each other that they comply with the DPS specification. The DSC 3012 sends "ConfigurePrintService" to the PD printer 1000 to check the status of the PD printer 1000 (600). In response to this, the PD printer 1000 notifies its status ("idle" in this case) at that time (601). Since the PD printer 1000 is "idle" in this case, the DSC 3012 sends an inquiry of capability data of the PD printer 1000 (602), and issues a print start request (StartJob) according to the capability data (603). Note that this print start request is issued from the DSC 3012 to the PD printer 1000 under the condition that "newJobOK" (to be described later) in status information sent from the PD printer 1000 is "True" (601).

In response to this print start request, the PD printer 1000 requests the DSC 3012 to send file information (information indicating the data size, encoding method, and the like of the file) on the basis of the file ID of designated image data to be printed (GetFileInfo) (604). In response to this request, the DSC 3012 sends the requested file information (FileInfo). This file information includes information such as a file size and the like. When the PD printer 1000 determines that it can receive and process the file information, it requests the DSC 3012 to send the file (GetFile) (605). In response to this request, image data (ImageFile) of the requested file is sent from the DSC 3012 to the PD printer 1000. When the PD printer 1000 starts a print process, status information indicating "Printing" is sent from the PD printer 1000 to the DSC 3012 using "NotifyDeviceStatus" (606). Upon completion of a print process for one page, the PD printer 1000 notifies the status using "NotifyJobStatus" (607) at the beginning of the process for the next page. If only one page is to be printed, the PD printer 1000 notifies "idle" using "NotifyJobStatus" (608) (NotifyJobStatus(Idle)).

For example, in case of N-up print that lays out and prints a plurality of (N) images per one page, every time N images are printed, "NotifyJobStatus" (607) is sent from the PD printer 1000 to the DSC 3012. The issuance timings of "NotifyJobStatus" and "NotifyDeviceStatus" and the acquisition order of image data in this embodiment are a merely example, and various cases may occur depending on product implementations.

Note that this print process includes a case wherein the DSC 3012 transmits a print start request (StartJob), which includes the file IDs of image data to be printed together, to execute a print process, and a case wherein the DSC 3012 transmits a print start request (StartJob), which includes only the file ID of a DPOF file used in normal photo development, to the PD printer 1000, which interprets the DPOF file to acquire the file ID of required image data, and prints it out.

<Overview of Print Job>

FIG. 7 depicts a view for explaining an actual example of a print start request command issued from the DSC 3012 to the PD printer 1000.

Referring to FIG. 7, reference numeral 720 denotes the configuration (jobconfig) of this print job; and numeral 721 denotes print information (printInfo).

The configuration 720 will be explained first. A tag 700 designates image quality to be printed (quality), which includes, e.g., "standard", "high image quality", and the like. A tag 701 designates a paper size (paperSize), and a tag 702 designates a paper type (papertype), which includes, e.g., "plain paper", "photo paper", "ink-jet dedicated paper", and the like. A tag 703 designates a type (fileType) of an image file to be printed. For example, when the DPOF is used, it is designated by this tag. A tag 704 designates the presence/absence of date print (datePrint); numeral 705 denotes the presence/absence of file name print (fileNamePrint); numeral 706 denotes image optimization ON/OFF (imageOptimize); numeral 707 denotes fixed size print (fixedSize); and numeral 708 denotes the presence/absence of print of a designated range of an image (cropping). The print information 721 includes a file ID (fileID) 709 and date information (date) 710.

FIGS. 8A and 8B depict views for explaining information included in JobStatus and DeviceStatus above. Note that JobStatus in FIG. 8A and DeviceStatus in FIG. 8B are sent from the PD printer 1000 to the DSC 3012. The DSC 3012 can send a transmission request of these kinds of information to the PD printer 1000 at an arbitrary timing.

Referring to FIG. 8A, "prtPID", "ImagePath", and "copyID" are enabled when print of a DPOF file is designated. Note that "prtPID" indicates identification information (ID) of a print section designated by the DPOF file, "ImagePath" indicates path information required to specify an image file designated by the DPOF file, and "copyID" indicates which of pages is being printed in practice upon designating a print process of a plurality of pages. In case of print of the DPOF file, the DSC 3012 describes "fileID" of the DPOF file in a print start request (StartJob), and transmits that request to the PD printer 1000. In response to this, the PD printer 1000 can start recording of that DPOF file. The PD printer 1000 acquires the DPOF file based on "fileID" of the DPOF file, and executes "GetFileID" to specify "fileID" of an image file designated in the DPOF file. The PD printer 1000 then requests the DSC 3012 to send the image file, and acquires the image data. In this manner, an image designated by the DPOF file can be printed. During execution of the print process based on the DPOF file, the PD printer 1000 notifies the DSC 3012 of "prtPID", "ImagePath", and "copyID" which indicate the current status of the print process using "NotifyJobStatus".

When the print process of the DPOF file is interrupted for some reason, and is restarted, that print process is restarted from the head of a page, the print process of which is canceled.

"progress" indicates a page which is currently printed of the designated number of pages to be printed (N/T). Note that N indicates the current recording page, and T indicates the total number of pages to be printed. Also, "imagePrinted" indicates the number of printed images.

DeviceStatus shown in FIG. 8B will be explained below.

"dpsPrintServiceStatus" indicates the status of the PD printer 1000, and is sent to the DSC 3012. This status information includes idle, print, and pause states. "jobEndReason" indicates end status of a print process, and is sent to the DSC 3012 upon completion of the print process of the last page.

"errorStatus" indicates error status, and is notified when an error has occurred. "errorReason" indicates the reason for occurrence of the error, and is sent together with "errorStatus". "disconnectEnable" indicates that a print process can be made even when the USB cable 5000 is disconnected, and is sent from the PD printer 1000 to the DSC 3012. "CapabilityChanged" indicates that capability data in the PD printer 1000 has changed, and is sent to the DSC 3012. "newJobOK" indicates that the PD printer 1000 is ready to receive a print request, and is sent to the DSC 3012.

<GetCapability>

FIGS. 9A and 9B depict views for explaining an actual example of an acquisition method of capability data of the PD printer 1000, which is issued from the DSC 3012 to the PD printer 1000.

FIG. 9A depicts a view for explaining a capability request command of the PD printer 1000 to be sent from the DSC 3012 to the PD printer 1000.

In the example of FIG. 9A, a capability acquisition request is issued by <getCapability> and </getCapability>, and an inquiry as to whether or not the PD printer 1000 has a layout print function as capability is issued by <layouts/> 901 bounded by <capability> and </capability>.

FIG. 9B shows an example of capability data returned from the PD printer 1000 to the DSC 3012 in response to the capability request in FIG. 9A.

In FIG. 9B, layout information 904 bounded by <layouts> 903 and <layouts/> 905 in capability information bounded by <capability> 902 and </capability> 906 notifies a layout function of the PD printer 1000.

As can be seen from FIG. 9B, in this embodiment, capability data are sent as 8-digit codes ("57000000", "57FE0000") from the PD printer 1000 to the DSC 3012. In this embodiment, layout capability is specified as a code, the upper 2 digits of which start with "57", and the next 2 digits indicate layout information, i.e., the number of images that can be printed per sheet. That is, the upper 4 digits "5701" indicate that a layout print process that prints one image per one sheet is allowed, and "5702" indicate that the printer has a layout print function that prints two images per one sheet. Note that the upper 4 digits "5700" indicate a mode which makes a layout print process using a default layout set in the PD printer 1000. That is, this means that capability data indicating that the PD printer 1000 supports a mode in which the DSC 3012 does not designate any number of images to be printed per one sheet and leaves such setup to the PD printer 1000, is returned from the PD printer 1000 to the DSC 3012. Also, "57FE" indicates that the PD printer 1000 supports an index print function. That is, images of a large number of frames can be printed on a single sheet. That is, in the example in FIG. 9B, layout print capability data returned from the PD printer 1000 indicates that the PD printer 1000 has a layout print mode using a default layout of the PD printer 1000, and an index print mode.

In FIGS. 9A and 9B, the method of exchanging capability data associated with the layout print function has been discussed. However, a function that can be confirmed by capability data is not limited to the layout print function. For example, there are various kinds of capability data: capability data about the types of sheets that can be printed by the PD printer 1000; capability data about the sheet sizes supported by the PD printer 1000; capability data about the file types of image data supported by the printer 1000; capability data indicating whether or not the printer 1000 can additionally print a date or file name to an image; capability data about print modes supported by the printer 1000; capability data about the presence/absence of automatic correction functions of an image supported by the printer 1000; and so forth. However, a description of detailed communication specifications of these capability data will be omitted.

FIG. 10 depicts a view for explaining an example of the configuration of a code which is used in the direct print system according to this embodiment so as to notify status and the like from the PD printer 1000 to the DSC 3012. As described above, each code has 8 digits, and a numerical value of each digit is a hexadecimal code.

Note that the upper 4 digits "XXXX" form a major code, and the lower 4 digits "YYYY" form a minor code. When the code is applied to the layout information 904 in FIG. 9B, the major code of the upper 4 digits indicates a layout print function, and the number of images to be printed per sheet. The minor code specifies more details of capability data indicated by the major code.

Figure 11:
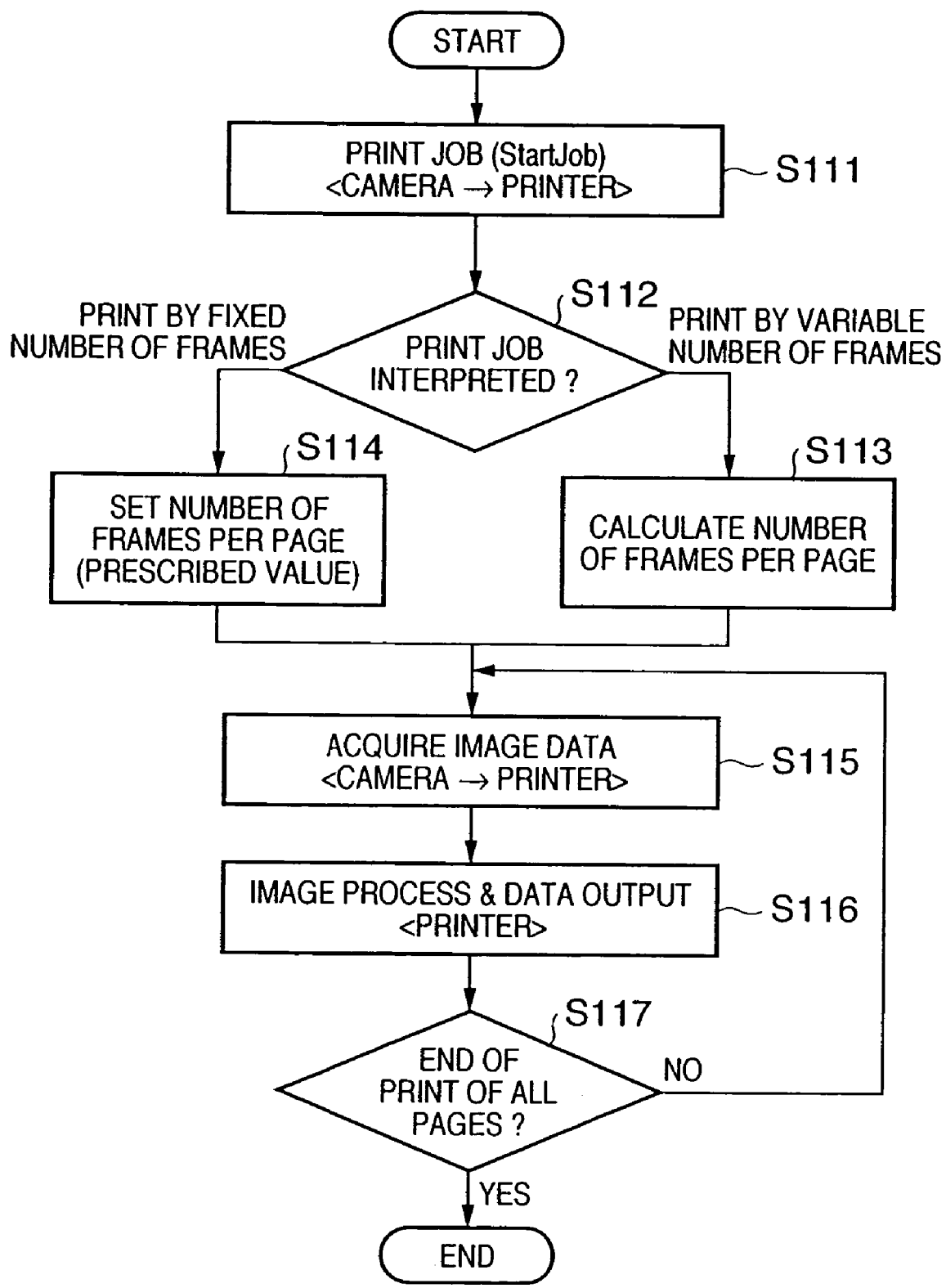
FIG. 11 is a flowchart for explaining the process from issuance of a print job until generation of print data in a print system according to the embodiment of the present invention.

FIG. 11 is a flowchart for explaining an index print process in the print system according to the first embodiment of the present invention.

When the DSC 3012 and PD printer 1000 are connected, a configuration process is done according to the specification (not shown) to establish a communication. Next, the two devices confirm each other according to a specification (not shown) if they are direct-print compatible models. With this process, the DSC 3012 acquires, from the PD printer 1000, capability data of the PD printer 1000 to display a UI on the display unit 2700. The DSC 3012 displays a UI according to the acquired capability data, and shifts to an idle state to wait for a print command from the user. As described above, since communications to be made by the DSC 3012 and PD printer 1000 at that time are minimized, the user's wait time can be shortened very much.

The user determines an image which is to undergo a direct print process and a print specification using the UI of the DSC 3012, and inputs a print instruction. As a result, the DSC 3012 generates a print job based on the print instruction, and issues StartJob to the PD printer 1000 in step S111. Upon reception of this, the PD printer 1000 receives and interprets the print job in step S112. In the first embodiment, assume that the print instruction from the user of the DSC 3012 is a print job that prints indices of 100 images. That is, the upper 4 digits of the 8-digit code designated by the <layouts> tag 903 of StartJob are "57FE".

The PD printer 1000 of this embodiment is capable of recording a maximum of 64 frames of index images on a single sheet. Upon reception of a print job of an index print, in which the number of images to be printed on a single sheet is not designated, the PD printer 1000 executes an enlargement/reduction process and settlement of a print position of each image under the condition that 64 frames of index images are to be printed.

Figure 12:
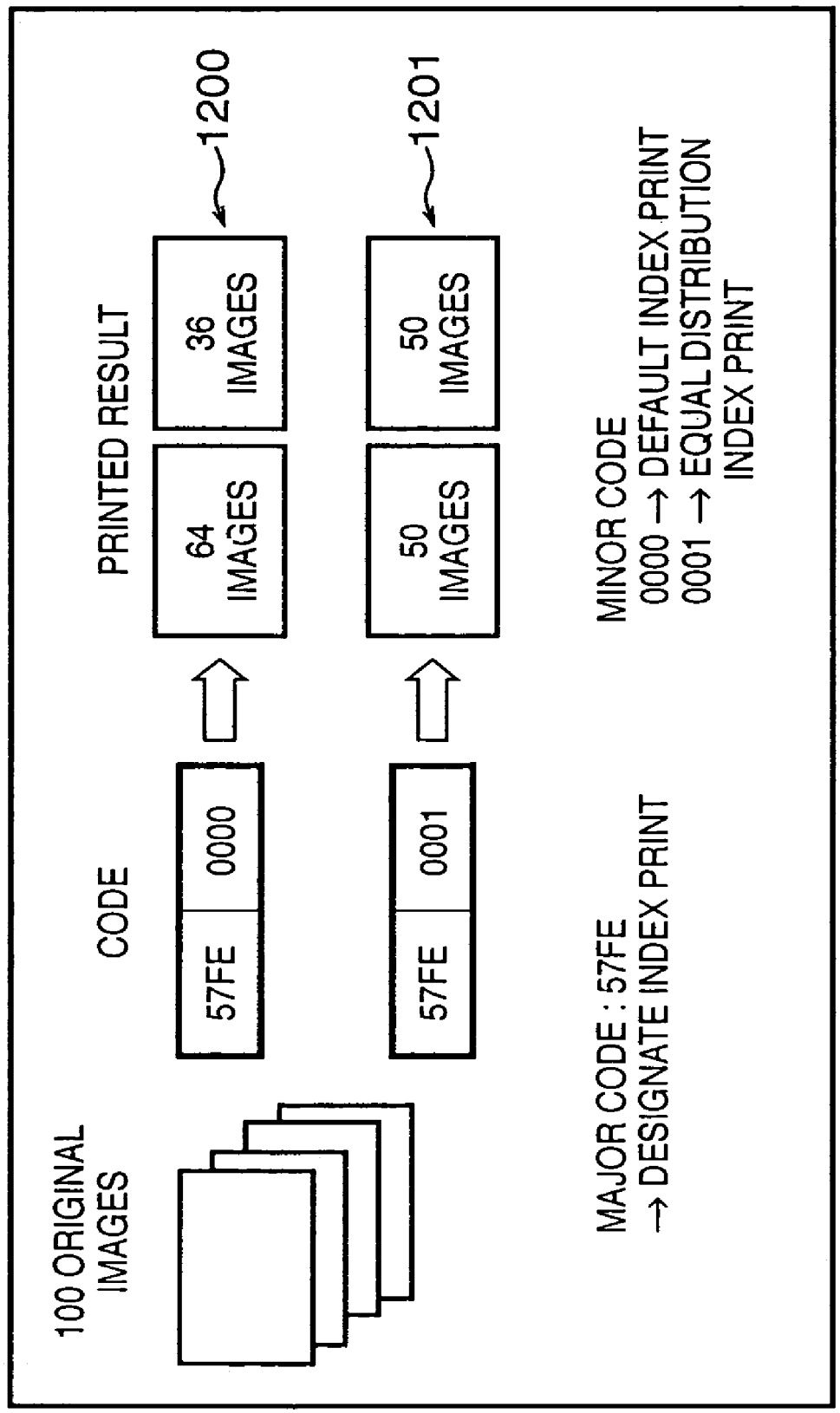
FIG. 12 depicts a view for explaining a practical example of an index print according to the embodiment of the present invention.

FIG. 12 depicts a view for explaining an index print according to the first embodiment.

If the lower 4-digit minor code of the <layouts> tag 903 of startJob is "0000", i.e., the 8-digit code designated by the <layouts> tag as well as the upper digits is "57FE0000", the flow advances to step S114 to specify the number of images to be printed on each sheet and images to be printed. In this case, a setup is made to print 64 images as the maximum number of images to be printed of the PD printer 1000 on the first sheet, and to print remaining 36 images on the second sheet. Note that the 36 images to be printed on the second sheet are printed with the same enlargement/reduction process and print positions as those when 64 images are to be printed on the first sheet. Hence, only the first half or more of the second sheet undergoes a print process, but the most of the second half is left unprinted. Of course, the 36 images can be fully printed on the second sheet. However, in this case, since the image size printed on the first sheet is different from that printed on the second sheet, images are preferably printed on two sheets to have the same size so as to standardize the size of print images.

On the other hand, if "57FE0001" is set in the code of the <layouts> tag, the flow advances to step S113. In this case, since the upper 4-digit major code is the same as that in the above example, it similarly indicates a print job that executes an index print process of 100 images. However, since "0001" is set in the lower 4-digit minor code, an index print mode in which the number of frames to be printed on each sheet is evenly distributed to each sheet is designated. More specifically, the PD printer 1000 used in this embodiment can print index images of a maximum of 64 frames per sheet. In case of recording of 100 index images, a setup is made to print 50 images each on two sheets.

After step S113 or S114 is executed, the flow advances to step S115 to settle image data to be printed on respective sheets, and to acquire image data to be printed on a target sheet from the DSC 3012. The flow advances to step S116 to calculate a print size per frame under the condition that index images corresponding to the number of frames per sheet settled in step S113 or S114 are printed, and to apply enlargement/reduction and image processes to respective image data on the basis of the calculated print size. Upon completion of the processes for images of a sheet to be printed, a print process is executed. It is then determined in step S117 whether the print processes of all index images are complete. If the print processes are complete, this process ends; otherwise, the flow returns to step S115 to acquire image data for the next index sheet, and to similarly process them.

In FIG. 12, an example 1200 corresponds to a print result after execution of the process in step S114, and an example 1201 corresponds to a print result after execution of step S113.

When the number of print frames per sheet is equal to or smaller than a maximum value (64 in this case), a larger frame size can be set compared to that upon recording 64 frames. As described above, although the number of index prints to be printed is to be reduced in terms of organization later, the print image size is preferably as large as possible to improve their utility. From such viewpoint, it is effective to execute a variable frame-count index print process that makes index prints by distributing 50 images each as in the example 1201.

On the other hand, when the user already has other sheets on which index images are printed, he or she wants to set the same size as that of index images on the previous index prints. In such case, index images of the same size are to be printed by recording 64 frames on the first sheet and 36 frames on the second sheet as in the former example.

In the first embodiment, since one of these index print modes can be selected using the UI of the DSC 3012, the needs of various users can be met. As described above, since the DSC 3012 can designate a desired index print mode by changing only the minor code value in the 8-digit code of the <layouts> tag upon issuing a print job to the PD printer 1000 according to the result of this UI operation, the aforementioned function can be implemented with nearly no implementation load.

Furthermore, since the minor code can be arbitrarily handled, as described above, even when a code that designates a variable frame-count index print mode of the DSC 3012 is transmitted to the PD printer 1000 which does not support the mode, an index print process is normally done except that the number of frames is fixed upon recording, thus greatly reducing the implementation load.

FIG. 13 is a flowchart for explaining the index print process in the PD printer 1000 according to the first embodiment of the present invention. A program that implements this process is stored in the program memory 3003*a*.

As described above, this process starts when a print job that executes an index print process of N images is designated by a print instruction from the DSC 3012. That is, this process is executed in a case where the upper 4 digits of the 8-digit code designated by the <layouts> tag 903 of StartJob are "57FE". The flow advances to step S121 to determine whether the minor code can be discriminated and the minor code is "0001", i.e., an equal distribution index print mode is designated. If the equal distribution index print mode is designated, the flow advances to step S122 to acquire the number N of images designated in the index print mode. The flow advances to step S123 to set "1" in a variable n used to count the number of sheets required for the index print process. It is determined in step S124 whether a value (N/n) obtained by dividing the number N of images by the variable n is larger than "64" (the maximum number of frames that can be printed per sheet). If the value is larger than "64", since only one (n) sheet falls short to print, the value of the variable n is incremented by +1 in step S125, and the flow returns to step S124.

If it is determined in step S124 that (N/n) becomes equal to or smaller than "64", the flow advances to step S126 to determine whether (N/n) is an integer. If (N/n) is an integer, the flow advances to step S127 to lay out (N/n) frames of images on n sheets. The flow then advances to step S128 to execute a variable magnification process of respective images in accordance with the sheet size and the number of images to be laid out on the sheet, thus generating index images. The flow advances to step S129 to execute an index print process for recording index images on n sheets.

If it is determined in step S126 that (N/n) is not an integer, the flow advances to step S130 to see if an integer part of (N/n) is equal to "64". If the integer part of (N/n) is equal to "64", the flow advances to step S125 to increment the variable n by +1, and the flow returns to step S124. That is, if the number of images which are to undergo an index print process is, e.g., 194, and 64 frames of images are printed in maximum on one sheet, 64 images are printed on three sheets, and only two index images are printed on the remaining one sheet. Hence, these 194 images are distributed to four sheets to print images on a total of four sheets, i.e., to print 48 frames of index images on two sheets, and 50 frames of index images on two sheets. However, if such distribution is not required, the process in step S130 may be skipped. If it is determined in step S130 that the integer part of (N/n) is not equal to "64", the flow advances to step S131. If N=nx+y, x frames of index images are laid out on each of (n−y) sheets of n sheets, and (x+1) frames of images are laid out on y sheets. The flow advances to step S128 to execute a variable magnification process of images in accordance with the sheet sizes and the number of images (x or (x+1)) to be laid out on each sheet, thus generating index images.

If it is determined in step S121 that the equal distribution index print mode is not designated, the flow advances to step S132 to acquire the number N of index images. The flow advances to step S133 to determine whether the number N of images is equal to or larger than "64" as the maximum number of index images that can be printed per one sheet. If N is not equal to or larger than "64", the flow advances to step S137 to lay out N frames of index images on one sheet. The flow then advances to step S128.

If it is determined in step S133 that the number N of images is equal to or larger than "64" as the maximum number of index images that can be printed per one sheet, the flow advances to step S134 to calculate the number n of sheets and the remaining number y of images using the number N of images=64×n+y. Sixty-four frames of index images are laid out on each of n sheets, and if the value y is not "0", y index images are laid out on one sheet. The flow then advances to step S128 to execute a variable magnification process of images according to the layout, thus generating index images. In this way, index images can be printed in accordance with the number N of images and the presence/absence of the equal distribution print mode.

In the first embodiment, the total number of images (frames) which are to undergo an index print process is determined by the number of images designated by a print job (StartJob).

The index print mode of the first embodiment is not always a print mode that prints all images saved in a memory card. For example, images of a file type supported by the PD printer 1000 may be extracted from those saved in the memory card, and the extracted images may be selectively printed, or only images selected by the user may be printed. That is, a print mode in which a plurality of images are to be printed, and a print job is passed to the PD printer without designating a print layout (the number of frames to be printed per sheet) upon recording is called an index print mode in this embodiment.

In the above example, the numbers of frames to be printed on all sheets become equal to each other in the equal distribution print mode. However, images cannot often be equally distributed depending on the number of images, and the numbers of frames to be printed on all sheets do not become equal to each other depending on conditions.

In the description of the first embodiment, the PD printer 1000 receives image data to be printed on one sheet from the DSC 3012 at once and applies an image process to them. Alternatively, a specification for alternately executing an image process and reception of image data may be adopted.

The second to ninth embodiments will be described hereinafter. In each of these embodiments, since the hardware arrangements of the PD printer 1000 and DSC 3012 are equal to those of the first embodiment, a description thereof will be omitted.

Second Embodiment

In the first embodiment, the total number of frames of images to be printed is determined by the number of images described in a print job (StartJob) prior to an index print process, and the number of frames to be printed on each sheet is then determined. However, in the second embodiment, it is determined whether each image is printable, and the number of frames to be printed on each sheet may be determined on the basis of the total number of actually printable images upon determining the total number of frames, in place of determining the total number of frames based on the number of images described in (StartJob).

More specifically, in the second embodiment, after designated image files to be printed are received from the DSC 3012, a decode process is executed to confirm if these images can be rendered without any problem, and the total number of frames to be printed is then determined. If it is confirmed in the decode process that a given image file suffers a problem and cannot be printed, the image is excluded from those to be printed. Therefore, upon reception of a print job, if the print job designates a default index print mode which prints 65 images, an index print process onto two sheets based on the maximum number of printable frames=64 is executed. However, in the second embodiment, if it is confirmed in a pre-check process that a given image file suffers a problem and one image cannot be printed, the number of images to be printed is 64, and 64 frames are laid out on one sheet upon executing the index print process.

Since the direct print function is controlled in this way, an index print process with an optimal layout can be implemented.

In the second embodiment, each image file is decoded as the pre-check process of an image file. Alternatively, a file type may be checked on the basis of a file name or the like to determine whether the file type is supported by the PD printer 1000, in place of the aforementioned pre-check process. Since most of image files store various kinds of information of images as tags, the pre-check process can be done without decoding all image files by, e.g., checking if the tags can be normally read and are appropriate.

The necessity of such pre-check process becomes higher if image data to be printed is digital data. That is, if an image to be printed is a film (analog data) taken by a silver halide camera, it can always be printed. However, in case of digital data, the image cannot often be printed due to various reasons such as a damaged data file, unsupported data format, and the like. Hence, unlike film data of a silver halide camera, the necessity of the pre-check process of image data is high. Note that the process after the number N of images to be printed is determined can be executed in the same manner as in the aforementioned first embodiment.

Third Embodiment

In the first and second embodiments described above, the total number of frames is determined based on data of one print job. However, a print job which is originally a single print job in the assumption of the above embodiment may be divided into a plurality of print jobs according to convenience of the DSC 3012, and these print jobs may be transferred to the PD printer 1000. Although many causes of such division are possible, for example, a print job must be divided into a plurality of jobs when the upper limit of the file size of the print job (StartJob) is exceeded, when the number of images that can be designated by one job is limited, and so forth. The PD printer 1000 and DSC 3012 exchange data via an interface. In this case, a print job may be divisionally transferred when the DSC 3012 makes to transmit a print job that exceeds the upper limit of a reception buffer size of the PD printer 1000 which receives the data, or in accordance with a data transfer rate and the like.

Assume that a print job for only 100 images can be generated upon executing an index print process with a total of 120 frames. In this case, the first print job designates an index print process of 100 images, and the next print job designates an index print process of 20 images. At this time, according to the operation of the first embodiment, the number of frames to be printed and print positions of frames on each sheet are initially determined for a total of 100 frames of images. Next, the number of frames to be printed and print positions of frames on each sheet are determined for a total of 20 frames of images. As a result, index images which can be originally printed on two sheets (60 images/sheet) are printed on three sheets, and a print result different from that upon transmission of a print job for a total of 120 frames is obtained.

In order to solve this problem, according to the third embodiment, when the PD printer 1000 receives one print job, it interprets the contents of the print job but does not immediately start the print process of the print job. The PD printer 1000 receives the next print job and interprets its contents. If the PD printer 1000 finds a print job which has the same condition as that of the previously received print job (the same index print job), it combines these print jobs. That is, when the first print job is that of a total of 100 frames, and the second print job is that of a total of 20 frames, the PD printer 1000 prints as if it were receiving a print job of a total of 120 frames. In order to implement this method, the third embodiment adopts the following method.

FIGS. 14A and 14B depict an example of a <notifyDeviceStatus> command that has been explained using FIG. 6. FIG. 14A shows an example of commands which are sent from the PD printer 1000 to the DSC 3012, and FIG. 14B shows an example of commands which are sent from the DSC 3012 to the PD printer 1000.

In FIG. 14A, a <newJobOK> tag 1401 is used to transmit information indicating whether or not the next print job can be sent from the PD printer 1000 to the DSC 3012. Note that the PD printer informs the DSC 3012 of status indicating that the printer is not ready to receive a new print job using "76000000", and status indicating that the printer is ready to receive a new print job using "76010000".

In FIG. 14A, since the contents of this' tag are "76000000", the PD printer 1000 is not ready to receive a new print job. Note that this 8-digit code includes a major code of upper 4 digits, and a minor code of lower 4 digits, as described above. Hence, the upper 4 digits are "7600" and transmission of a new print job is basically inhibited. However, when a value "0001" is described in the minor code, it specifies that only the same print job as the previous one, i.e., a print job continuous to the previous print job can be sent. Therefore, the PD printer 1000 inhibits a new print job in principle by appending "7600" as the major code of the <newJobOK> tag 1401, and sets "0001" in the minor code. In this way, when the next print job is sent from the DSC 3012, it can be processed while determining that the next print job is the same as the previous one, i.e., it is continuous to the previous print job.

If the DSC 3012 is a camera that cannot understand the minor code of the <newJobOK> tag 1401, it checks only the major code and cannot send the next print job. Also, print jobs cannot be combined if the PD printer cannot receive the next print job after next due to a memory limitation. However, since the upper limit of data to be exchanged is generally set in correspondence with a device with the smallest memory size, a plurality of print jobs can be normally received, and it is effective to combine print jobs.

Figure 15:
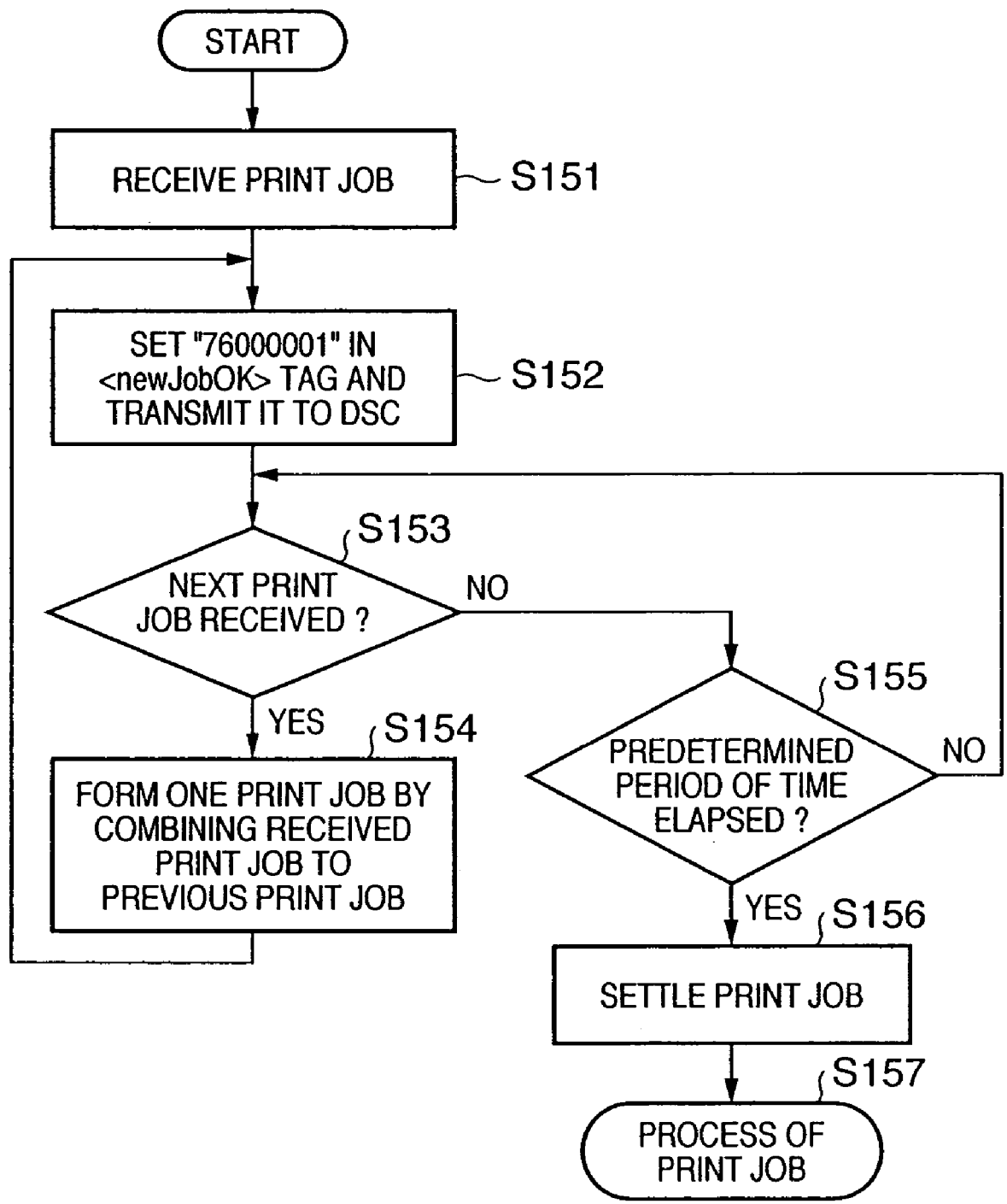
FIG. 15 is a flowchart for explaining a print job reception process in the PD printer according to the third embodiment of the present invention.

FIG. 15 is a flowchart for explaining a print job reception process in the PD printer 1000 according to the third embodiment of the present invention. A program that implements this process is stored in the program memory 3003a.

Upon reception of a print job from the DSC 3012 in step S151, the flow advances to step S152, and the PD printer 1000 returns DeviceStatus to the DSC 3012. In this case, the PD printer 1000 sets "76000001" in the aforementioned <newJobOK> tag 1401 to indicate that it is ready to receive the same print job, and sends it to the DSC 3012. In this way, the PD printer 1000 notifies the DSC 3012 that it can successively receive print jobs if they are the same print jobs.

The flow advances to step S153 to determine whether the next print job is received. Upon reception of the next print job, since it is determined that the DSC 3012 understands the minor code of the <newJobOK> tag 1401 sent in step S152 and sends a print job, the PD printer 1000 combines the previously received print job and the currently received print job into one print job. The flow returns to step S152 to repeat the aforementioned process.

If it is determined in step S153 that the next print job is not received, the flow advances to step S155 to confirm that no print job is received after an elapse of a predetermined period of time. The flow then advances to step S156 to settle the print job received so far, and the PD printer 1000 starts the process of the settled print job (S157). As the process of this print job, the process shown in the flowchart of FIG. 13 is executed.

Figure 16:
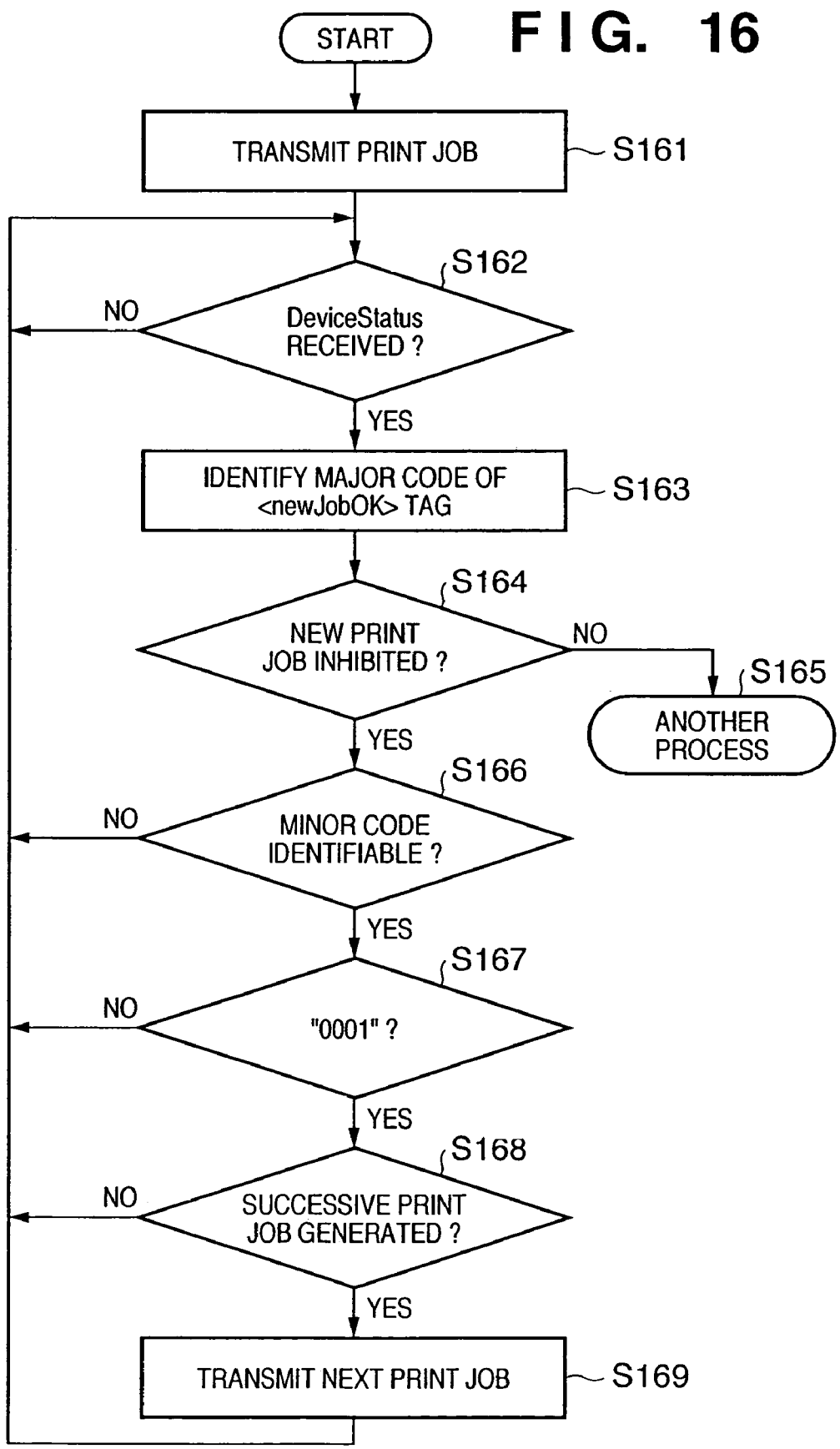
FIG. 16 is a flowchart for explaining a print job transmission process in the DSC according to the third embodiment of the present invention.

FIG. 16 is a flowchart for explaining a print job issuance process in the DSC 3012 according to the third embodiment of the present invention. A program that implements this process is stored in the ROM 3101.

This process starts when a print job is generated, and must be transmitted to the PD printer 1000. In step S161, the DSC 3012 transmits a print job to the PD printer 1000. The flow advances to step S162 to determine whether DeviceStatus is received from the PD printer 1000. If DeviceStatus is received, the flow advances to step S163 to check the major code of the <newJobOK> tag 1401. It is determined in step S164 whether the transmission of a new print job is inhibited. If no inhibition code is included, the flow advances to step S165 to execute a corresponding process.

If it is determined in step S164 that the transmission of a new print job is inhibited (major code="7600"), the flow advances to step S166 to determine whether the minor code of the tag is identifiable. If the minor code is identifiable, the flow advances to step S167 to determine whether the code allows to receive the same print job, i.e., it is "0001". If YES in step S167, the flow advances to step S168 to determine whether a print job continuous to the print job that has been previously transmitted to the PD printer 1000 is generated. If such job is generated, the flow advances to step S169 to transmit the generated print job to the PD printer 1000. In this way, the continuous print jobs are received in step S154 in FIG. 15 above. If "NO" in step S166, S167, or S168, the flow returns to step S162 to receive next DeviceStatus transmitted from the PD printer 1000.

Furthermore, in a case where the presence of identical print jobs is known in advance like in the third embodiment, there are many devices that allow to receive the next print job (e.g., a command decoder that interprets a command is temporarily separated), but a detailed description thereof will be omitted.

Furthermore, in the third embodiment, the next print job is received using the <newJobOK> tag only when identical print jobs are generated. Alternatively, a method of unconditionally receiving the next print job, interpreting it to determine whether it is an identical print job, and executing print control may be used, as a matter of course.

Fourth Embodiment

As described above, since the principal purpose of an index print is to confirm images, index images appended with identifiers are normally printed. As the identifiers, file names may be used, but serial numbers indicating the order of images are often used.

The user who uses such index images acquires a list of images stored in the memory card by making an index print. The user then selects images to be printed with reference to the index images. The user inputs numbers appended to the selected images using the UI of the DSC 3012 to designate images to be printed. An index print allows various use methods, but is often used in the above use. At this time, if a print job is divided into a plurality of jobs, they may create confusion upon selection of images. In the fourth embodiment, the PD printer 1000 combines a plurality of divided print jobs to successively assign identifiers appended to respective frames of index images to all the images to be printed based on the combined job, thus allowing optimal numbering.

In the fourth embodiment, numbers are used as identifiers. However, a combination of a character string and number or only a character string may be used.

Even when a print job of an index print is divided into a plurality of jobs, identifiers can be successively appended even to different jobs by appending information (e.g., start number) that specifies identifiers to be appended to respective images to the jobs. For example, information that specifies identifiers to be laid out on the second or subsequent sheet is appended to a job for recording the second or subsequent sheet in accordance with the numbers of images to be laid out on a plurality of print sheets as in the first embodiment. In this way, upon assigning serial numbers in turn from the first image, even when the number of images to be laid out on each sheet adaptively changes depending on the total number of images, serial numbers can be given.

That is, assume that a maximum of 50 images can be laid out on one sheet in a print job that executes an index print process of 80 images. In this case, if the minor code of "57FE0001" cannot be understood, images are printed on the second sheet in turn from the 51st image. Hence, an instruction that designates the start number=51 is appended to the index print instruction of the second sheet. On the other hand, if the minor code of "57FE0001" can be understood, images are to be laid out on the second sheet in turn from the 41st image. Hence, an instruction for designating the start number=41 is appended to the index print instruction of the second sheet.

Fifth Embodiment

<GetCapability>

FIGS. 17A and 17B depict views for explaining an actual example of an acquisition method of capability data of the PD printer 1000, which is issued from the DSC 3012 to the PD printer 1000.

FIG. 17A depicts a view for explaining a capability request command of the PD printer 1000 to be sent from the DSC 3012 to the PD printer 1000.

In the example of FIG. 17A, a capability acquisition request is issued by <getcapability> and </getCapability>, and an inquiry as to whether or not the PD printer 1000 has a layout print function as capability is issued by <layouts/> 1711 bounded by <capability> and </capability>.

FIG. 17B shows an example of capability data returned from the PD printer 1000 to the DSC 3012 in response to the capability request in FIG. 17A.

In FIG. 17B, layout information 1714 bounded by <layouts> 1713 and <layouts/> 1715 in capability information bounded by <capability> 1712 and </capability> 1716 notifies a layout function of the PD printer 1000.

As can be seen from FIG. 17B, in the fifth embodiment, capability data are sent as 8-digit codes ("57000000", "57010000", "57020000") from the PD printer 1000 to the DSC 3012. In the fifth embodiment, layout capability is specified as a code, the upper 2 digits of which start with "57", and the next 2 digits indicate layout information, i.e., the number of images that can be printed per one sheet. That is, the upper 4 digits "5701" indicate that a layout print process that prints one image per one sheet is allowed, and "5702" indicate that the printer has a layout print function that prints two images per one sheet. Note that the upper 4 digits "5700" indicate a mode which makes a layout print process using a default layout of the PD printer 1000. That is, in the example of FIG. 17B, the layout print capability data of the PD printer 1000 indicate that the printer has three different layout print functions, i.e., a layout print function for recording one image per one sheet, a layout print function for recording two images per sheet, and the default layout print function of the PD printer 1000.

In FIGS. 17A and 17B, the method of exchanging capability data associated with the layout print function has been discussed. However, a function that can be confirmed by capability data is not limited to the layout print function. For example, there are various kinds of capability data: capability data about the types of sheets that can be printed by the PD printer 1000; capability data about the file types of image data supported by the printer 1000; capability data indicating whether or not the printer 1000 can additionally print a date or file name to an image; capability data about print modes supported by the printer 1000; capability data about the presence/absence of automatic correction functions of an image supported by the printer 1000; and so forth. However, a description of detailed communication specifications of these capability data will be omitted.

Note that the configuration of a code used to notify status and the like from the PD printer 1000 to the DSC 3012 in the direct print system according to the fifth embodiment is the same as that described using FIG. 10 of the first embodiment above, and a description thereof will be omitted.

In a case where such code is applied to the layout information 1714 in FIG. 17B, the major code of the upper 4 digits indicates a layout print function, and the number of images to be printed per one sheet. The minor code specifies more details of capability data indicated by the major code.

For example, in case of a layout print function that prints four images per sheet, the major code "5704", and the minor code of the lower 4 digits can designate a layout of these four images to be printed on a sheet. In the fifth embodiment, the minor code "0000" that follows "5704" designates a print layout that lays out and prints four images in a border mode. Also, the minor code "0001" designates a print layout that lays out and prints four images in a borderless mode.

In the fifth embodiment, the PD printer 1000 notifies the DSC 3012 of its print function capability data by sending 8-digit codes indicating capability data to the DSC 3012. Note that the 8-digit code is formed of a major code of upper 4 digits, and a minor code of lower 4 digits, i.e., a combination of two codes having different recognition levels: the major code which can always be recognized by general cameras, and the minor code which is likely to be skipped or not recognized by some cameras. That is, the PD printer 1000 can notify the DSC 3012 that it has capability which allows a layout print process of four images, and has a layout print function which lays out and prints four images in a border mode ("57040000") or a layout print function which lays out and prints four images in a borderless mode ("57040001").

In case of the DSC 3012 that can understand only the major code, its camera UI displays that "layout of four images is selectable". However, if the minor code can also be recognized, the UI can display that various print layout functions which allow the user to also select layout patterns of four images are available.

As described above, since a plurality of levels of information can be transmitted by a single code, that code can support layout print processes under various conditions.

In the fifth embodiment, a layout print function and border and borderless print modes as print patterns of this layout print function are expressed by one code. Adverse effects encountered if these functions are expressed by independent codes will be briefly explained below.

If these two codes are independent codes, the control may be done as follows. That is, the DSC 3012 requests the PD printer 1000 to send the layout capability of the PD printer

1000 by <layouts> of <getCapability>, as described above using FIG. 17A. Next, another tag (e.g., <Border> or the like) is defined as a tag required to acquire border/borderless print capability, and the DSC 3012 acquires capability data of the border/borderless print function. However, since the border/borderless print function has high subordinacy with respect to the layout function, the PD printer 1000 may not be able to independently return only capability data of <Border>. Therefore, if the PD printer 1000 supports layout print functions from 2- to 64-up layouts, the DSC 3012 must send inquiries about border/borderless capability data such as an inquiry about capability of <Border> of a 2-up layout, an inquiry about capability of <Border> of a 3-up layout, and the like while designating layouts in turn. As a result, a heavy load is imposed on exchange of capability information, and a long wait time is occurred from when the user wants to execute a direct print process until the direct print function is ready to actually use.

Also, since many complicated communications are required between the DSC 3012 and PD printer 1000, the communication load becomes heavier. In addition, in order to make such complicated communications, a program that checks the communication results and controls to execute operations according to the checking results is required, and its program size becomes huge. Such problems result in a delay of the developing period and an increase in cost. Unlike a print process via a PC, in case of a direct print function which suffers limited CPU processing performance and memory size, such huge program size and high cost pose very serious problems.

However, according to the fifth embodiment, since the border/borderless print function can be set using the minor code of <layouts> capability, as described above, the heavy communication load and implementation load, long wait time required for the user, and the like can be greatly reduced.

Since the printer 1000 need only return identical capability data irrespective of whether or not the DSC 3012 wants information of the availability of the border/borderless print function, the implementation load in the PD printer 1000 can also be reduced.

<Image Specifying Method>

A method of specifying an image upon recording an image will be explained below.

Information of the print condition is sent from the DSC 3012 to the PD printer 1000 using StartJob (a command that designates a print job), as has been explained using FIG. 7. An image to be printed is designated by a <fileID> tag (709 in FIG. 7). That is, a list of the handle numbers of print images is described in the tag to specify images to be printed. Since FIG. 7 exemplifies not designation of a layout print process for recording a plurality of images, but that of a print process for recording only one image, only one handle number (handle number "00000001") is described. However, in case of a layout print process for recording two images, two handle numbers each expressed by 8 digits are sent in parallel. After the handle numbers of images to be printed are sent to the PD printer 1000, the PD printer 1000 requests the DSC 3012 to send image files designated by these handle numbers prior to a print process. In this case, the PD printer 1000 must acquire information of images to prepare for reception of image files before it acquires image files.

FIGS. 18A and 18B show an example of commands required to exchange image data between the PD printer 1000 and DSC 3012.

FIG. 18A shows an example of a command sent when the PD printer 1000 requests the DSC 3012 to send image data with a handle name "00000001".

FIG. 18B shows an example wherein the DSC 3012 sends image data to the PD printer 1000 in response to the request. In this case, the DSC 3012 sends information: image file type <fileType> and image file size <filesize> (number of bytes) to the PD printer 1000.

More specifically, for example, in a case where this command is implemented on PTP of USB, it is processed as follows. That is, the PD printer 1000 serving as a USB host receives "ObjectInfoDataset" of the handle numbers of designated images to be printed from the DSC 3012 serving as a USB slave. Note that this "ObjectInfoDataset" includes a plurality of data fields. For example, in case of acquisition of file type information, the file type can be specified based on the contents of "ObjectFormatCode" in these data fields. In PTP, "ObjectFormatCode" is expressed by a 4-digit hexadecimal code. An "ObjectFormatCode" table separately specifies a file type expressed by that code (e.g., JPEG, TIFF, GIF, or the like), and the file type can be specified based on the table. Also, a folder that stores a designated image to be printed can be specified from information of a data field of "ObjectInfoDataset".

Note that an overview of the file information acquisition method has been explained taking USB-PTP as an architecture under the transport layer as an example. Such file information can be generally acquired by most of interfaces although acquisition methods are different depending on interfaces.

FIG. 19 shows a print example obtained when both the DSC 3012 and PD printer 1000 according to the fifth embodiment can interpret the minor code. FIG. 19 shows a print example in a case where the major code designates a function of recording a photographing date of an image, and the minor code designates a description method of the date to be printed.

In this example, recording of an original image 1900 and date "August 22nd, 2003" (1901) is designated. When a <dateprints> code "54020000" (1902) is transmitted, i.e., when a print process added with a date in which a character string "August" that means August into a numerical value "08", and which is rearranged in an order suited to numerical notation is designated as a print job, the designated original image 1900 to be printed, and the character string "2003, Aug. 22" indicating the date are printed on a single sheet (1904).

Upon reception of a <dateprints> code "54020001" (1903), the designated original image 1900 and the character string "August 22nd, 2003" indicating the date using a US-ASCII+ISO-8859-1 character set are printed on a single sheet (1905). In this way, a flexible, advanced print process can be attained.

If the code "54020001" is transmitted from the DSC 3012 to the PD printer 1000, and the PD printer 1000 does not support a print mode using the US-ASCII+ISO-8859-1 character set, the image and date are printed on a single sheet (1904) in the same format (default format) as that printed upon transmission of the code "54020000". Although the date print process using the US-ASCII+ISO-8859-1 character set is often preferred, it is very convenient since the numerical date information and designated image, i.e., an associated image and associated information (date in this case) are printed on a single sheet.

Figure 20:
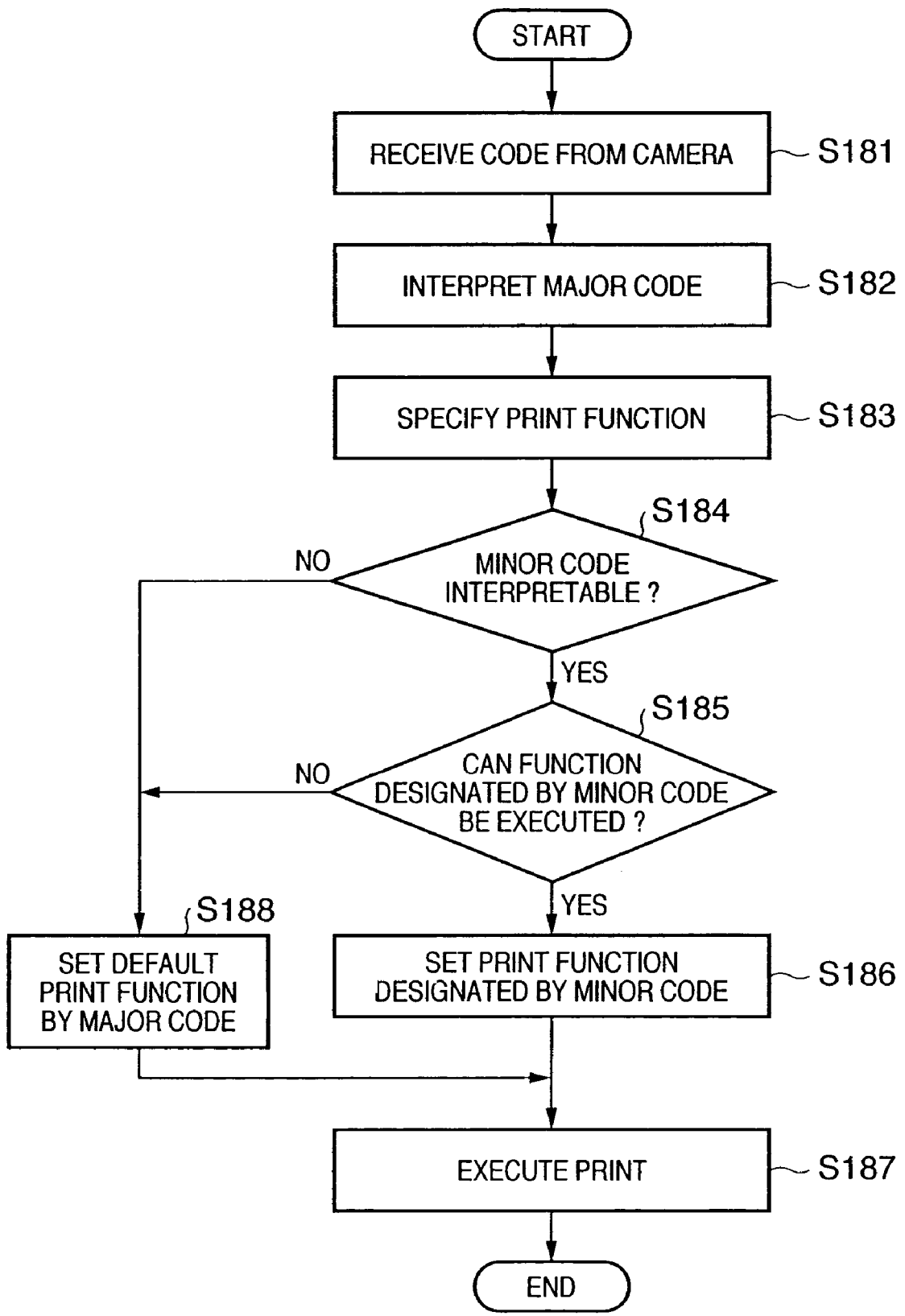
FIG. 20 is a flowchart for explaining code interpretation and print processes in the PD printer according to the embodiment of the present invention.

FIG. 20 is a flowchart showing the code interpretation and print processes in the PD printer 1000 according to the fifth embodiment. A program that implements this process is stored in the program memory 3003a.

In step S181, the PD printer 1000 receives a code (FIG. 10) that designates, e.g., a date print function from the DSC 3012. The PD printer 1000 interprets the major code of the received code in step S182, and recognizes a print function designated by the major code in step S183. The flow advances to step S184 to determine whether the minor code of the code is interpretable. If the minor code is interpretable, the flow advances to step S185 to determine whether the PD printer 1000 has the print function designated by the minor code. If the PD printer 1000 has the print function, the flow advances to step S186, and the PD printer 1000 sets the print function designated by the minor code. For example, in the example of FIG. 19 above, whether a character string "August 22nd, 2003" is rendered using ASCII codes and is printed, or the character string is converted into a numerical value "2003/08/22" which is printed is set. The flow advances to step S186, and an image to be printed is output to and printed by the printer engine 3004 in accordance with the set print function.

On the other hand, if it is determined in step S184 that the minor code is not interpretable, or if it is determined in step S185 that the print function designated by the minor code cannot be executed, the flow advances to step S188 to execute a print process in a default print mode corresponding to the major code.

Sixth Embodiment

Figure 21:
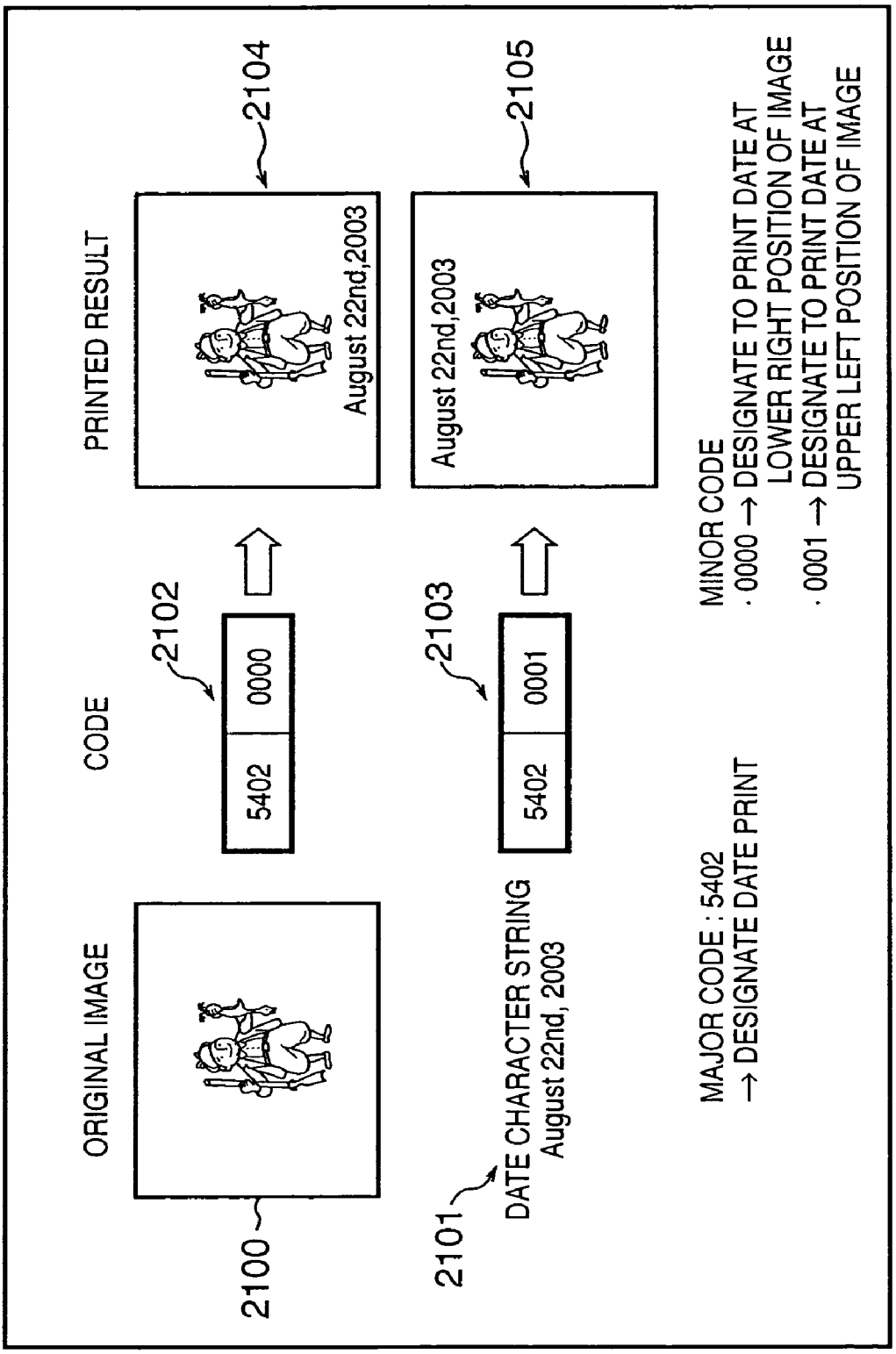
FIG. 21 shows a print result example in a direct print system according to the sixth embodiment of the present invention.

FIG. 21 shows a print example obtained in a case where both the DSC 3012 and PD printer 1000 according to the sixth embodiment of the present invention can interpret the minor code. FIG. 21 shows a printed example in a case where the major code designates a function of recording a photographing date of an image ("5402"), and the minor code designates a print position of the date to be printed.

In this example, the recording of an original image 2100 and date "Aug. 22nd, 2003" 2101 is designated. When a <dateprints> code "54020000" (2102) is transmitted, i.e., when it is designated to print the date "Aug. 22nd, 2003" at the lower right position of the sheet, a character string of the date is printed at the lower right position of the original image (2104).

Upon reception of the <dateprints> code "54020001" (2103), the character string "Aug. 22nd, 2003" of the date is printed at the upper left position of the sheet of the original image (2105). In this way, a flexible, advanced print process can be attained.

If the code "54020001" is transmitted from the DSC 3012 to the PD printer 1000, and the PD printer 1000 can interpret the minor code but does not have a function of recording a date at the upper left position, the date is printed in the same format as that upon reception of the code "54020000" (2104). In this manner, when the PD printer 1000 does not have a function corresponding to the minor code, the date is not printed at the upper left position of the sheet against the user's wish (2105). However, it is very convenient since the designated original image 2100 and date information 2101, i.e., an associated image and associated information are printed on a single sheet.

In this case as well, the date print function is specified in steps S182 and S183 in the aforementioned flowchart of FIG. 20, and a print result 2104 or 2105 can be obtained in accordance with the contents of the minor code in steps S186 and S187. If the minor code cannot be interpreted or the function designated by the minor code cannot be executed, a date print process (2104) is executed in step S188.

Seventh Embodiment

FIG. 22 shows a printed example obtained in a case where both the DSC 3012 and PD printer 1000 according to the seventh embodiment of the present invention can interpret the minor code. FIG. 22 shows a printed example when the major code designates the number of images (the number of layout images) to be printed on one sheet (paper), and the minor code designates whether respective images are to be printed on the sheet in a border or borderless mode.

When a layout print <layout> code "57040000" (2201) is sent from the DSC 3012 to the PD printer 1000, i.e., a print process of a 4-up layout in the border mode is designated as a print job, four designated images are printed on one sheet in the border mode (2203).

When a code "57040001" (2202) is sent, four designated images are printed on one sheet in the borderless mode (2204).

If the code "54020001" (2202) is sent from the DSC 3012 to the PD printer 1000, and the PD printer 1000 can interpret the minor code but does not support a function of recording images in the borderless mode, four designated images are printed on one sheet in the border mode (2203) in the same format as that upon sending the code "54020000" (2201).

In this case as well, a layout print function and the number of images are specified in steps S182 and S183 in the aforementioned flowchart of FIG. 20, and a print result 2203 or 2204 can be obtained in accordance with the contents of the minor code in steps S186, and S187. If the minor code cannot be interpreted or the function designated by the minor code cannot be executed, a print process of a 4-up layout in the border mode (2203) is executed in step S188.

Eighth Embodiment

FIG. 23 shows a printed example obtained in a case where both the DSC 3012 and PD printer 1000 according to the eighth embodiment of the present invention can interpret the minor code. FIG. 23 shows a printed example in a case where the major code designates the number of images (the number of layout images) to be printed on one sheet (paper), and the minor code designates a multi-reduced-scale print function which can designate information of the number of images and layout of an image to be printed at a plurality of positions on a single sheet.

When a layout print <layout> code "57010000" (2301) is sent, i.e., a normal print process of a 1-up layout is designated, one designated original image 2300 is printed on one sheet (2303). When a code "57010001" (2302) is sent from the DSC 3012 to the PD printer 1000, one designated original image 2300 is printed on one sheet to have sizes ¼ the sheet size (two images), ⅛ (two images) 1/16 (two images), and 1/32 (four images) in the borderless mode (2304).

If the code "57010001" (2302) is sent from the DSC 3012 to the PD printer 1000, and the PD printer 1000 can interpret the minor code but does not support a multi-reduced-scale print function, the designated original image 2300 is printed on one sheet in the border mode (2303) in the same format as that upon receiving the code "57010000" (2301).

In this case as well, a layout print function and the number of images are specified in steps S182 and S183 in the aforementioned flowchart of FIG. 20, and a print result 2303 or 2304 can be obtained in accordance with the contents of the minor code in steps S186 and S187. If the minor code cannot be interpreted or the function designated by the minor code cannot be executed, the designated original image 2300 is printed on one sheet in step S188 (2303).

Ninth Embodiment

FIG. 24 shows a printed example obtained in a case where both the DSC 3012 and PD printer 1000 according to the ninth embodiment of the present invention can interpret the minor code. FIG. 24 shows a printed example in a case where the major code designates a print region of an image to be printed on one sheet (paper), and the minor code designates a cropping shape of the image to be printed on the sheet.

When an image cropping <cropping> code "59020000" (2401) is sent, i.e., a cropping print process for cropping an image in a rectangular shape is designated, the designated region of one designated original image 2400 is cropped and printed on one sheet (2403). When a code "59020001" (2402) is sent, the designated range of the designated original image 2400 is cropped into a rhombic shape, and is printed on one sheet (2404). In this manner, a flexible, advanced print process can be attained.

If the code "59010001" (2402) is sent from the DSC 3012 to the PD printer 1000, and the PD printer 1000 can interpret the minor code but does not support a cropping print function that crops an image into a rhombic shape, the designated range of the designated original image 2400 is cropped in a rectangular shape and is printed on one sheet (2403) in the same format as that upon receiving the code "59010000" (2401).

In this case as well, an image cropping print function is specified in steps S182 and S183 in the aforementioned flowchart of FIG. 20, and a print result 2403 or 2404 can be obtained in accordance with the contents of the minor code in steps S186 and S187. If the minor code cannot be interpreted or the function designated by the minor code cannot be executed, the designated range of the designated original image 2400 is cropped into a rectangular shape and is printed on one sheet in step S188 (2403).

Another Embodiment

This embodiment begins with a request of function information of the printer from the DSC 3012 as the image supply device, and exchanges each other's function information. Alternatively, this embodiment can also be achieved by beginning with a request of function information of the DSC 3012 as the image supply device from the printer 1000 as the image recording device, and by exchanging each other's function information.

The objects of the present invention can also be achieved by supplying a storage medium, which records a program code of a software program to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. As the storage medium for supplying the program code, for example, a floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application Nos. 2003-298794 and 2003-298797 filed Aug. 22, 2003, which are hereby incorporated by references herein.

What is claimed is:

1. A recording system which includes an image supply device and an image recording device, both complying with a predetermined standard, wherein the image recording device records an image on a recording medium on the basis of image data supplied from the image supply device,
   wherein a command code to be exchanged between the image supply device and the image recording device has a predetermined number of digits, wherein upper digits of the command code construct a common code and lower digits of the command code construct a unique code, wherein an interpretation of the common code is the same by all image recording devices complying with the predetermined standard, and wherein an interpretation of the unique code changes according to each image recording device even if all image recording devices comply with the predetermined standard,
   wherein in a case that the command code designates a layout of images to be recorded on the recording medium by the image recording device, the common code can be used to designate an index recording function, and if the common code designates the index recording function, then the unique code is used to designate a determination method of a number of index images to be recorded on a single recording medium in the index recording function, and
   wherein when the common code designates the index recording function, the image recording device sets the index recording function, and the image recording device interprets the unique code to determine a number of index images to be recorded on one recording medium based on the determination method, and determines the maximum number of index images that can be recorded on the one recording medium and a total number of index images designated by the command code, so that the image recording device records the index images designated by the command code on one recording medium or a plurality of recording media.

2. The system according to claim 1, wherein the determination method of the number of index images includes:
   a first mode of recording the maximum number of index images that can be recorded on one recording medium on at least one recording medium, and recording remaining index images corresponding to the total number of index images using a plurality of recording media; and
   a second mode of recording index images on a plurality of recording media by roughly equally dividing the total number of index images.

3. The system according to claim 2, wherein the total number of index images corresponds to the number of images, which satisfy a predetermined condition, of index images which are designated to undergo an index recording process from the image supply device.

4. The system according to claim 2, further comprising assignment means for assigning successive identifiers to respective index images of respective recording media divided in the second mode in accordance with the unique code.

5. A recording apparatus for recording an image on a recording medium on the basis of image data supplied from an image supply device, wherein both the recording apparatus and the image supply device comply with a predetermined standard, the apparatus comprising:
- a reception unit constructed to receive a command code having a predetermined number of digits from the image supply device, wherein upper digits of the command code construct a common code and lower digits of the command code construct a unique code, wherein an interpretation of the common code is the same by all recording apparatuses complying with the predetermined standard, and wherein an interpretation of the unique code changes according to each recording apparatus even if all recording apparatuses comply with the predetermined standard;
- a determination unit constructed to determine whether the common code designates an index recording mode for recording index images, in a case that the command code received by the reception unit is for designating a layout of images to be recorded on the recording medium; and
- a control unit constructed to determine a number of index images to be recorded on the recording medium according to a determination method of the number of index images designated by the unique code, the maximum number of index images that can be recorded on one recording medium and a total number of the index images, in a case where the determination unit determines that the common code designates the index recording mode, and constructed to record the index images on the one recording medium or a plurality of recording media in accordance with the command code from the image supply device.

6. The apparatus according to claim 5, wherein the determination method designated by the unique code includes an equal distribution recording mode of recording index images by roughly equally distributing index images to be recorded per recording medium, and a recording mode based on recording index images corresponding to the maximum number of images that can be recorded on the one recording medium.

7. A recording control method in a recording device for recording an image on a recording medium on the basis of image data supplied from an image supply device, wherein the recording device and the image supply device both comply with a predetermined standard, the method comprising:
- a reception step of receiving a command code having a predetermined number of digits from the image supply device, wherein upper digits of the command code construct a common code and lower digits of the command code construct a unique code, wherein an interpretation of the common code is the same by all recording devices complying with the predetermined standard, and wherein an interpretation of the unique code changes according to each recording device even if all recording devices comply with the predetermined standard;
- a determination step of determining if the common code designates an index recording mode for recording index images, in a case that the command code received in the reception step is for designating a layout of images to be recorded on the recording medium; and
- a control step of controlling to determine a number of index images to be recorded on the recording medium according to a determination method of the number of index images designated by the unique code, the maximum number of index images that can be recorded on one recording medium and a total number of the index images, in a case where it is determined in the determination step that the common code designates the index recording mode, and to record the index images on the one recording medium a plurality of recording media in accordance with the command code from the image supply device.

8. The device according to claim 7, wherein the determination method designated by the unique code includes an equal distribution recording mode of recording index images by roughly equally distributing index images to be recorded per recording medium, and a recording mode based on recording index images corresponding to the maximum number of index images that can be recorded on the one recording medium.

9. The system according to claim 1, wherein the unique code includes a default code and a vendor unique code.

10. The system according to claim 9, wherein the unique code defines that the command code is any one of the default code and the vendor unique code.

* * * * *